US012725628B2

(12) United States Patent
Juneja et al.

(10) Patent No.: US 12,725,628 B2
(45) Date of Patent: Sep. 1, 2026

(54) VOICE IDENTIFICATION FOR OPTIMIZING VOICE SEARCH RESULTS

(71) Applicant: Adeia Guides Inc., San Jose, CA (US)

(72) Inventors: Ajay Juneja, Punjab (IN); Vaibhav Gupta, Bangalore (IN); Ashish Gupta, Bangalore (IN); Senthil Kumar Karuppasamy, Bangalore (IN); Reda Harb, Bellevue, WA (US)

(73) Assignee: Adeia Guides Inc., San Jose, CA (US)

( * ) Notice: Subject to any disclaimer, the term of this patent is extended or adjusted under 35 U.S.C. 154(b) by 384 days.

(21) Appl. No.: 17/551,895

(22) Filed: Dec. 15, 2021

(65) Prior Publication Data

US 2023/0186941 A1 Jun. 15, 2023

(51) Int. Cl.

| | |
|---|---|
| ***G10L 15/22*** | (2006.01) |
| ***G10L 15/26*** | (2006.01) |
| ***G10L 25/27*** | (2013.01) |
| ***G10L 25/54*** | (2013.01) |

(52) U.S. Cl.

CPC .............. *G10L 25/54* (2013.01); *G10L 15/22* (2013.01); *G10L 15/26* (2013.01); *G10L 25/27* (2013.01); *G10L 2015/221* (2013.01); *G10L 2015/223* (2013.01)

(58) Field of Classification Search

CPC ......... G10L 25/54; G10L 15/22; G10L 15/26; G10L 25/27; G10L 2015/221; G10L 2015/223

See application file for complete search history.

(56) References Cited

U.S. PATENT DOCUMENTS

| | | | | |
|---|---|---|---|---|
| 10,770,071 | B2 * | 9/2020 | Alameh | G10L 15/22 |
| 11,862,168 | B1 * | 1/2024 | Leblang | G10L 21/02 |
| 2005/0071161 | A1 * | 3/2005 | Shen | G10L 15/22 704/E15.04 |
| 2022/0300560 | A1 * | 9/2022 | Filice | G06F 16/90335 |

* cited by examiner

*Primary Examiner* — Pierre Louis Desir
*Assistant Examiner* — Kristen Michelle Masters
(74) *Attorney, Agent, or Firm* — HG LAW LLP

(57) ABSTRACT

Systems and methods are provided for processing a voice input stream with interruptions and/or supplemental comments. Generally, a virtual voice assistant may receive an input stream with a first input comprising a voice query from a first voice and a second input comprising a secondary query from a second voice (e.g., an interruption or a supplement). The virtual assistant may determine that the second voice does not match the first voice, and then process the voice query to produce first results. Some embodiments may determine whether the secondary query is a supplement or an interruption and, e.g., choose to ignore an interruption or set aside a supplement if it may be used to help the search query. In some embodiments, results for the first query may be compared with results for the first query with a portion of the supplement.

15 Claims, 15 Drawing Sheets

VOICE IDENTIFICATION FOR OPTIMIZING VOICE SEARCH RESULTS

BACKGROUND

The present disclosure relates to automated speech recognition systems, and more particularly to systems and methods of identifying an interrupting and/or supplemental voice in a voice query.

SUMMARY

Use of voice searching has increased tremendously. Implementations, such as voice-enabled assistants on smartphones, tablets, computers, speakers, and other connected devices, may allow enhanced, quick search mechanisms via voice. In many cases, voice searching may be used to search for content in almost any application, making voice-enabled searching very effective and useful. Generally, search results may be generated based on an input stream comprising a query input by a user and the best or top-ranked result(s) may be provided via speaker, display, or other output as answers. When a user provides a voice query search as a voice input stream, e.g., in the presence of one or more other people in proximity to the input microphone, there is a chance that the one or more other persons may be speaking (e.g., input) during the input stream of the voice query. In some instances, such interruptions may be captured by the microphone and some words from the interrupting speech may be inappropriately added to the input steam and, thus, the voice query. Such interruptions can degrade the quality of search results. There exists a need to eliminate interrupting inputs captured for the input stream. In some cases, however, a second user may chime in by inputting supplemental information that could aid a voice search. There further exists a need to incorporate supplemental information in an input stream for a voice search while, e.g., while discarding interrupting inputs.

Currently, many voice search assistants implement a cloud-based "wake word" verification mechanism. This is done to reduce false wakes and discard any utterance when needed, since a wake word may appear in background television audio, e.g., in programs and commercials. For instance, with Amazon® and Apple® devices with virtual assistants, respectively, the wake word "Alexa" or "Siri" may be part of a TV commercial that mentions the word "Alexa" or "Siri." It is very common for a smart speaker to capture the user's speech and stream the voice to a cloud-service for verification, analysis, and other processing. For example, Amazon's Alexa streams a user's speech to Alexa Voice Services (AVS) when a wake word such as "Alexa" is detected by the wake word engine typically residing on the smart speaker or consumer device. It is also common to stream a predetermined number of milliseconds (e.g., 300 ms) of audio that was said before the wake word for calibration purposes (e.g., ambient noise level) and to enable a better speech recognition. Typically, an audio stream from the device may be paused or stopped when the user stops speaking or when the device receives a directive from the cloud service to stop capturing a user's speech. Similarly, many voice assistants may identify a user interacting with them via voice identification using voice profiles. Such services may, e.g., ask the user to repeat few sentences during setup and generate a voice profile (assigned with a voice ID) for the user so that they can personalize some services (e.g., a command such as "play my favorite music" results in playing songs that actually match the user's taste). Voice identification may use voice fingerprinting, e.g., a mathematical expression of a person's voice or vocal tract, to identify a user making a voice query.

One problem with conducting voice searches may be handling background speech. For example, a first user interacting with a virtual voice assistant might be in a room with other people that are having a dialogue, and the voice assistant may capture whatever was being said in the background into the input stream despite the first user having no intention for them to be heard by the voice assistant. However, given the proximity of the other people to the person conducting a voice search, words from a "side conversation" may be unintentionally captured and streamed to the cloud service as part of the voice query. Such a problem may be detrimental to speech recognition and can often yield unwanted voice search results (and errors). In some cases, errors due to side conversation may require a user to repeat the search query.

Voice assistants may approach such an issue in various ways. For example, existing techniques may use wake word acoustics to discard or ignore background noise. More specifically, an acoustic snapshot of the wake word may be compared to the acoustics of the speech that follows a wake word. The portion that is not matched is treated as background noise and discarded. Such technique may reduce the speech recognition errors by a good percentage; however, speech recognition error may still be high. Speech recognition errors may be dramatically reduced if the voice profile of the person conducting the search is verified at the input phase in order to discard additional words that are not uttered by the user conducting the search.

When a user provides an input comprising a command (e.g., whether via the wake-up word while close to the device or far away, or by pressing a dedicated button on a device such as a remote control), a user's input speech may be streamed to an automatic speech recognition (ASR) service and then passed to a natural language processing (NLP) service. Often, the output of the ASR is fed to the NLP module for analysis and to determine a user's intent. Some platforms today may combine the ASR and NLP modules for faster and more accurate interpretation.

One approach to minimize interrupting speech in voice queries may be to differentiate the voice(s) of one or more different people and accept input only from the primary user or first user to present a query. A voice engine may be used to differentiate a main voice in an input stream by, e.g., eliminating input by voices from other users, which may help in providing better search results. For instance, a first person may input a voice search method to search for a movie by speaking "the Caribbean on stranger tides." In between, a second person—present in a same room, perhaps a little farther away from the microphone—may speak the word "car." Without setting aside the interruption, the search may unfortunately combine the two speech items in the input stream and become merged to something like "the Caribbean car on stranger tides."

Some approaches may provide the input stream, e.g., the merged request, as a search and allow a search engine to filter out the improper terms. This is typically inefficient. Moreover, such an approach may not always generate correct results. For instance, users of a voice search may only want the top one (or few) results, and allowing an insertion of an additional term from interrupting speech may contaminate a top result of the voice query. Accordingly, there exists a need to filter out terms from interrupting speech based on identifying a voice of the interrupting speaker.

In some embodiments of the present disclosure, a profile ID of the person conducting the search is used by the automatic speech recognition module in order to determine which words to pass to the NLP algorithm, as opposed to just using the voice profile when communicating with a back-end logic of an application (e.g., music app) for personalization purposes. In some embodiments, the ASR platform may determine a percentage of words in a query (or combination of queries) that match one voice profile and set aside the rest of the query as likely background noise or interruptions. Since multiple users can interact with the same smart speaker, e.g., using the same account but different profiles, the ASR module may focus on finding a general match to any of the voice profiles available at the initial speech recognition stage. For instance, at this stage, there may be little concern with regards to who is speaking since personalization does not occur until later in the process. Accordingly, matching voices to approximate profiles (or, e.g., default profiles based on voice pitch and tone) may allow a virtual assistant to quickly identify and eliminate voices of interrupters.

In some embodiments, any additional input that, e.g., may have been captured as part of the input stream and may have been converted to text but deemed as background noise by the ASR may be passed on to the NLP module as secondary data—e.g., with such text marked as potentially "supplemental" so that it may be used by the NLP module, if necessary, to complete or enhance a search query. For example, if the NLP module can construct a valid/genuine search query (e.g., via a call to an application programming interface (API)) based on the primary text that was sent by the ASR, then the supplemental text may not be used. Moreover, supplemental terms may be used if, e.g., feedback is provided to the ASR/NLP module that the search failed, cannot be completed, or the results are too vague or ambiguous. The feedback can be in the form of an indicator such as an acknowledgement of a success or failure for the search. In such an instance, instead of immediately querying the user for additional information, the supplemental data can be automatically used to fulfill the failed first search request.

In some embodiments, the ASR might detect that a small percentage of the query matches a second voice profile (e.g., one word out of five words uttered). That one word, in such case, may be tagged as supplemental to the NLP to allow the NLP to generate variants of the search query where at least one variant takes the one word into consideration. There might be instances where a second user participates in the search query, for example, there might be scenarios where two people perform a voice query where the first person utters "what's the name of the movie that has Michelle Pfeiffer" and a second user completes the search query by uttering "and Tony Montana." The NLP module might find the last part of the query, even though it is associated with a different voice profile, to be essential to the overall query. For example, making an API call to a search engine that retrieves names of movies with a parameter "actor: Michelle Pfeiffer" might not return the desired search results, however, passing the second parameter ("Tony Montana") as an "AND" argument might retrieve the movie that the first person intended to find: "Scarface." The optional or supplemental data may be used if the original search result did not yield a number of listings that meet or exceed a threshold number that is acceptable, e.g., the expansive catalog of films that Michelle Pfeiffer has appeared in.

Similarly, in some embodiments, detecting two actors in the same string even when the parts of the string are associated with different voice profiles can be an indication of a joint search by two different people. Additionally, the presence of pauses, hesitation markers, and/or filler terms (e.g., "umm," "ah," etc.) between the utterance of the first user and the second user can also be an indication that the second user may be completing the query on behalf of the first user. In such case, the presence of two voice profiles may be accepted and the second part of the query (e.g., the supplemental information) may not be discarded as background noise.

A profile ID (e.g., a string and/or series of alphanumeric characters) does not necessarily need to be part of the search unless it is determined that personalization is essential for best results. A profile ID is typically needed when the user issues a command such as "Play my favorite music," in which case the profile ID may be needed by the music search service to determine the identity of the user to access the user's preferences and select a song that match the user's preferred type and/or favorites. Such determination may be made by the ASR/NLP module based on the intent derived from processing the user's speech as well as the back-end service that the query is intended for. For example, a generic query such as "Will it rain tomorrow?" does not require the use of a voice profile, since the results are not dependent on the user's identity as much as they may depend on the location of the device.

In some embodiments, the acoustics of one or more voice inputs associated with a second detected voice profile are determined. This can be used to classify some words as "interrupters" within an input stream. For example, a voice platform may initially assume that the profile that initiated the voice search uttered the first portion of the search query and words associated with a second or different voice profile that occurred after the first portion of the query are "interruption words" that are not intended to be used—e.g., if the pitch, loudness, or other sound metric of such words is substantially different than the metric of the words preceding them (e.g., much higher or louder, changes in pitch or tone, etc.). Such measurement can serve as a confirmation to the ASR that such words are interruptions so that they may be set aside or discarded more efficiently without perfectly matching each voice input with a profile.

In some embodiments, the supplemental data may be sent to the search engine or intended service via a second API call with an indication that the supplemental data is related to the previous search query. This can speed up a search based on the first query, while performing context analysis on the secondary data to determine a context strength value—e.g., determining whether the supplemental data is relevant to the first query. Relevance can be determined based on, e.g., predicated relations between the various terms. For instance, relevance may be determined based on whether both terms are classified as name(s) of one or more actors, directors, and/or sports teams, etc. A weight value may be assigned to the secondary data based on its predicted relevance to the other portion of the string. It is not always necessary for the search engine to repeat the search, and the engine may use the supplemental data in response to receiving a second search from the same device ID within a predetermined time period (e.g., 30 seconds). The second search may indicate the first search failed and therefore the supplemental data should be used to refine the user's intent in the second search.

Described herein are systems and methods of processing a voice input stream comprising a set of voice queries with interruptions and/or supplemental comments. Generally, a virtual voice assistant may receive a first input comprising a voice query from a first voice, receive a second input comprising a secondary query from a second voice, determine that the second voice does not match the first voice, and then, in response to determining that the second voice does not match the first voice, process the voice query to produce first results. For instance, the virtual assistant may determine that the second voice is likely an interruption because it does not match the first voice and, thus, only process the first voice. Typically, automated speech recognition may be performed for the entire input stream. In some cases, ASR may be performed for each query in order to process each as a search and/or respond as a query. For instance, the voice query may comprise a first set of text based on the first input and the second query may comprise a second set of text based on the first input.

Some embodiments may additionally determine, based on the first results, whether the secondary query from the second input in the voice input stream, e.g., is a supplement or an interruption and choose to ignore an interruption or set aside a supplement if it may be used to help the search query. Such determining, for instance, may be performed by calculating a relevance score for the first results, determining whether the relevance score meets or exceeds a predetermined threshold (e.g., 75 on a scale of 0-100). Then, in response to determining the relevance score fails to meet or exceed the predetermined threshold, the virtual assistant may label the secondary query as an interruption of the input stream, and provide the first results; however, if the relevance score meets or exceeds the predetermined threshold, the virtual assistant may label the secondary query as a supplement and process the voice query with one or more portions of the secondary query to produce second results for provision.

In some embodiments, results for the first query may be compared with results for the first query with a portion of the supplement. For instance, the virtual assistant may calculate a first relevance score for the first results, process the voice query with one or more portions of the secondary query to produce second results, calculate a second relevance score for the second results, and compare the first relevance score to the second relevance score. If the second relevance score meets or exceeds the first relevance score, a portion of the second results may be provided, e.g., as a virtual assistant response to the query or queries.

In some embodiments, determining whether the second voice matches the first voice may be performed by comparing traits of the first voice with traits of the second voice, determining, based on the comparison, a voice match score, determining that the voice match score is less than a match threshold (e.g., 50 on a scale of 0-100), and outputting that no match exists. Likewise, a match score above the threshold may indicate a match or indicate that another trait should be used to attempt to differentiate the voices. Such a comparison may be performed quickly, e.g., analyzing amplitude and/or reverberation of each voice to swiftly identify if each of the voice inputs in the input stream come from the same direction. In some embodiments, determining whether the second voice matches or does not match the first voice may use a trained model. For instance, the virtual assistant may input the first voice input and the second voice input into a model trained to accept at least two voice inputs and return a determination of whether the at least two voice inputs match as an output.

In some embodiments, determining whether the second voice matches the first voice may be performed by comparing each voice to a set of voice profiles, e.g., stored in a database. For instance, the virtual voice assistant may access a plurality of voice profiles, compare the first input to the plurality of voice profiles to determine a first profile for the first voice, compare the second input to the plurality of voice profiles to determine a second profile for the second voice, and determining that the first profile and is not a match to the second profile. If both matched profiles do not match each other, then it is likely that no match exists.

Some embodiments may additionally determine the second voice does not match the first voice by, e.g., receiving a third input (as part of the voice input stream) comprising a third query from a third voice, determining that the third voice matches the first voice, and combining the third query with the first query. For instance, when the second input interrupts the first user in the input stream providing a query via the first input and the third input, e.g., the virtual assistant may identify that the third voice is actually the first voice and the corresponding queries should be combined.

In some embodiments, a user may repeat a query (e.g., input a similar query more than once) due to background noise. In some cases, the virtual assistant may, e.g., after identifying that the second voice does not match the first voice, receive a third input comprising a third query from a third voice, determine that the third query matches the first query and/or the second query, transmit a command to pause or mute content, receive a fourth input comprising a fourth query, and process the fourth query.

More specifically, in some embodiments, in response to the ASR/NLP not recognizing the user's intent or in response to another user or the same user (e.g., based on the voice profile) repeating the same query within a threshold time or consecutively, a noise source may be identified in order to take an action on the source. For example, various consumer devices such as set-top boxes and smart televisions may be controlled by a virtual assistant. In such cases, the voice assistant can automatically issue a command such as mute, pause, display captions, etc., for a short duration (e.g., duration of input capture, or a limit of, e.g., 5-10 seconds) in order to capture the user's query without superfluous noise.

Similarly, conducting a voice search on a phone (e.g., using Siri on an iPhone®) may allow the phone to auto-issue a mute command to any content being played on the phone, as well as a nearby Apple TV®, e.g., via a background service. Today, users can control their televisions from their phones manually; however, the auto-mute or lower-volume command can be issued if it is detected that a currently playing program is the source of the noise. Content identification services, e.g., Shazam®, may be used to identify the media content in the background and enable a device such as a phone to issue a command to the appropriate TV. For example, the virtual remote control on the phone has access to the content metadata (e.g., title of the show) that's currently being played on the TV since the TV displays a recognizable picture of the program. Therefore, a smartphone may be able to confirm by fingerprinting the background "noise," which is potentially the TV program, in order to determine the source of the content (e.g., which device). This service might only need to be invoked in scenarios where, e.g., a repetition of the voice query is detected.

Described herein are systems and methods of processing one or more voice inputs and/or queries that were repeated due to, e.g., too much background noise. Some embodiments may receive a first voice input, receive a second voice input, and determine whether the first voice input matches the second voice input. Then, in response to determining that the second voice input matches the first voice input, a virtual assistant may transmit a command to pause or mute content, receive a third voice input comprising a query, and process the query. In some embodiments the virtual assistant may transmit a command to resume or unmute content. In some embodiments, determining whether the first voice input matches the second voice input may comprise generating a first waveform for the first voice input, generating a second waveform for the second voice input, and comparing the first waveform with the second waveform to determine a sound match score based on the comparison. Then, the virtual assistant may output whether a match exists, e.g., if the sound match score meets or exceeds a predetermined threshold.

In some embodiments, determining whether the first voice input matches the second voice input may comprise determining, e.g., using automated speech recognition (ASR), a first query based on the first voice input, determining a second query based on the second voice input, comparing the first query with the second query, and determining a substance match score based on the comparison of the queries. Then, a virtual assistant may output that a match exists if the substance match score meets or exceeds a predetermined threshold. Some embodiments, in response to determining that the second voice input does not match the first voice input, may determine, e.g., using ASR, a second query based on the second voice input and process the second query before receiving a third voice input. Some embodiments may determine whether the third voice input matches at least one of the first voice input and second voice input and, in response to determining the match, transmit a second command to pause or mute content, receive a fourth input comprising a fourth query, and process the fourth query.

In some embodiments, a virtual assistant may determine whether the first voice input matches the second voice input by using a trained machine learning model to generate data indicative of whether the first voice input matches the second voice input. For instance, a trained machine learning model may generate data indicative of whether the first voice input matches the second voice input based on, e.g., waveform, amplitude, pitch, distance from microphone, recognized text from speech, reverberation, sound features, etc.

Some embodiments may transmit the command to pause or mute content by, e.g., extracting a portion of audio from at least one of the following inputs: the first voice and the second input, identifying a content source based on the extracted portion of audio, and transmitting to the identified source the command to pause or mute content. Some embodiments may transmit the command to pause or mute content via a network.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1A:
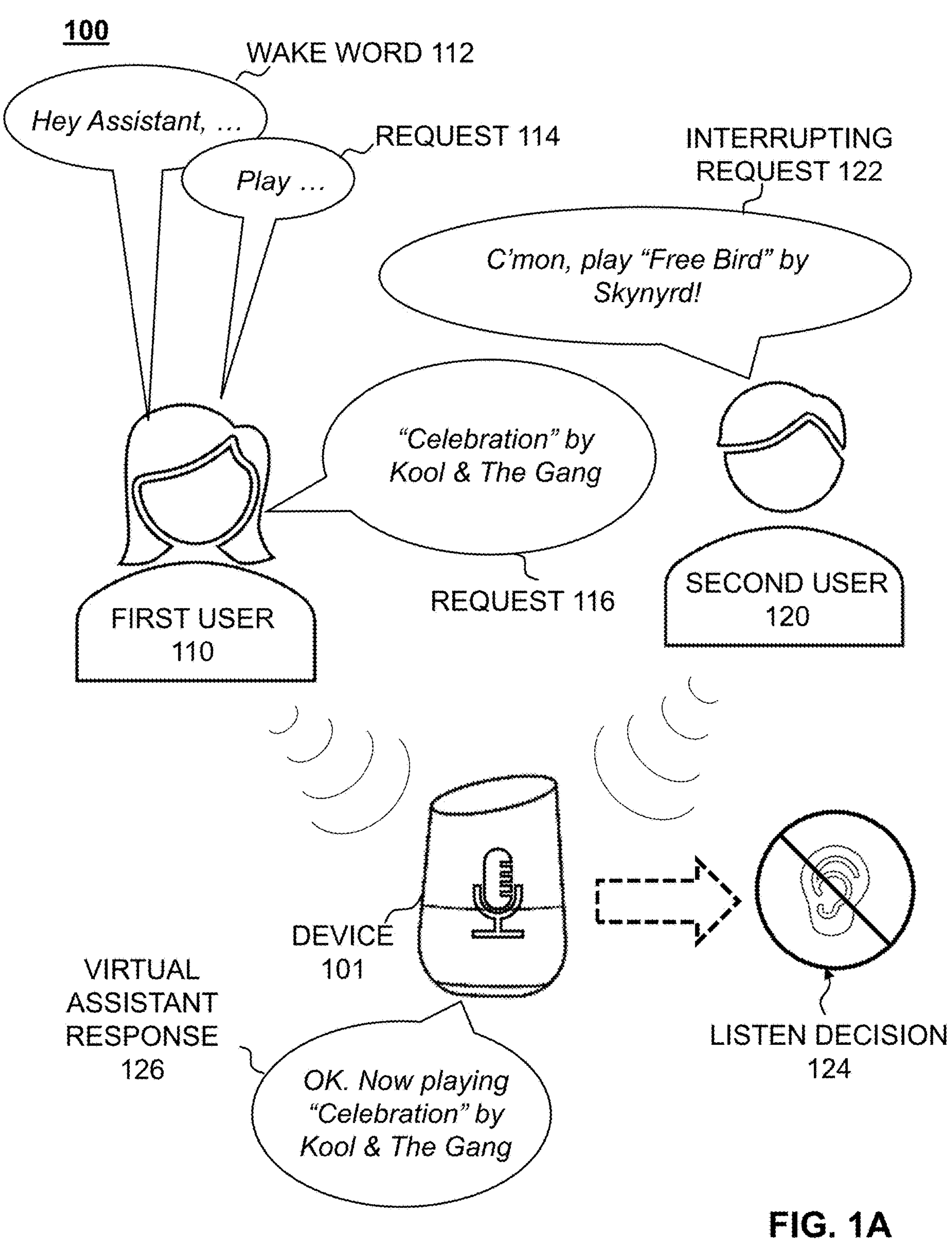
FIG. 1A illustrates an exemplary scenario of determining whether to include an interruption as part of a voice query, in accordance with embodiments of the disclosure.

FIG. 1A illustrates an exemplary scenario of deciding whether to include an interruption in a voice input stream as part of a voice query, in accordance with embodiments of the disclosure. For instance, a voice query issued by a first user may be interrupted by a request from a second user. By way of a non-limiting example, scenario 100 of FIG. 1A illustrates device 101 capturing statements from first user 110 and second user 120. For example, a first user, e.g., the host of a party, may be requesting a song to be played and is interrupted by an interjecting party guest who requests a different song, e.g., that may not be appropriate for the situation.

Device 101 may be any computing device providing a user interface, such as a voice assistant, a virtual assistant, and/or a voice interface allowing for voice-based communication with a user and/or via an electronic content display system for a user. Examples of such computing devices are a smart home assistant similar to a Google Home® device or an Amazon® Alexa® or Echo® device, a smartphone or laptop computer with a voice interface application for receiving and broadcasting information in voice format, a set-top box or television running a media guide program or other content display program for a user, or a server executing a content display application for generating content for display to a user. In some embodiments, computing devices may work in conjunction such as devices depicted in FIGS. 2-4, a television, a set-top box, a computer, a laptop, a smartphone, a tablet, a speaker, a microphone, or device and/or server(s).

Figure 5:
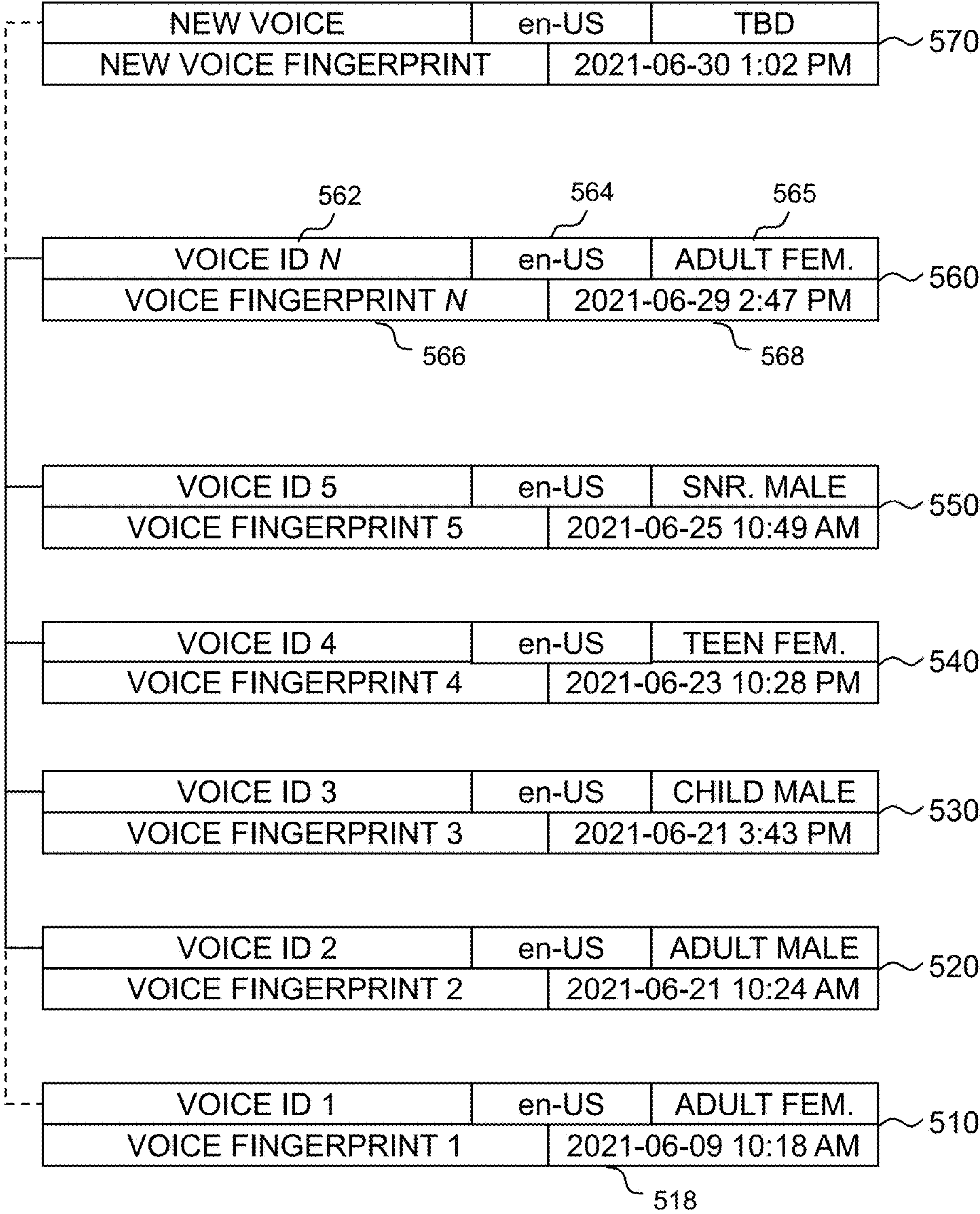
FIG. 5 depicts an illustrative data structure for voice profiles, in accordance with some embodiments of the disclosure.

In scenario 100, first user 110 and second user 120 are attempting to query device 101. For example, each of first user 110 and second user 120 may be making a request for a virtual assistant interface of device 101, and each user may be in the same room/area or not. In some embodiments, first user 110 and second user 120 may each be considered a user of device 101, e.g., making queries and requests to device 101 regularly and each have a voice profile with device 101. In some embodiments, both first user 110 and second user 120 may be using device 101 for the first time. FIG. 5 depicts an exemplary data structure for a voice profile database.

Device 101 captures each request from first user 110 and second user 120. One or more of wake word 112, request 114, interrupting request 122 and request 116 may be captured as an input stream, e.g., to be processed by a virtual assistant. In some embodiments, device 101 automatically converts audio/voice to text for each portion of the input stream, e.g., using automated speech recognition (ASR). In some embodiments, device 101 transmits audio files to a server to convert audio/voice to text for each request. For instance, first user 110 may speak wake word 112 ("Hey Assistant, . . . ") to activate the virtual assistant on device 101. First user 110 may begin request 114, saying, "Play . . . " before being interrupted with interrupting request 122 from second user 120. For instance, interrupting request 122 may include a request for a song that is unpopular or inappropriate for the situation, e.g., saying, "C"mon, play "Free Bird" by Skynyrd!" First user 110 may follow request 114, e.g., after a brief pause, perhaps due to an interruption, with request 116, requesting to play ""Celebration" by Kool & The Gang."

Figure 6:
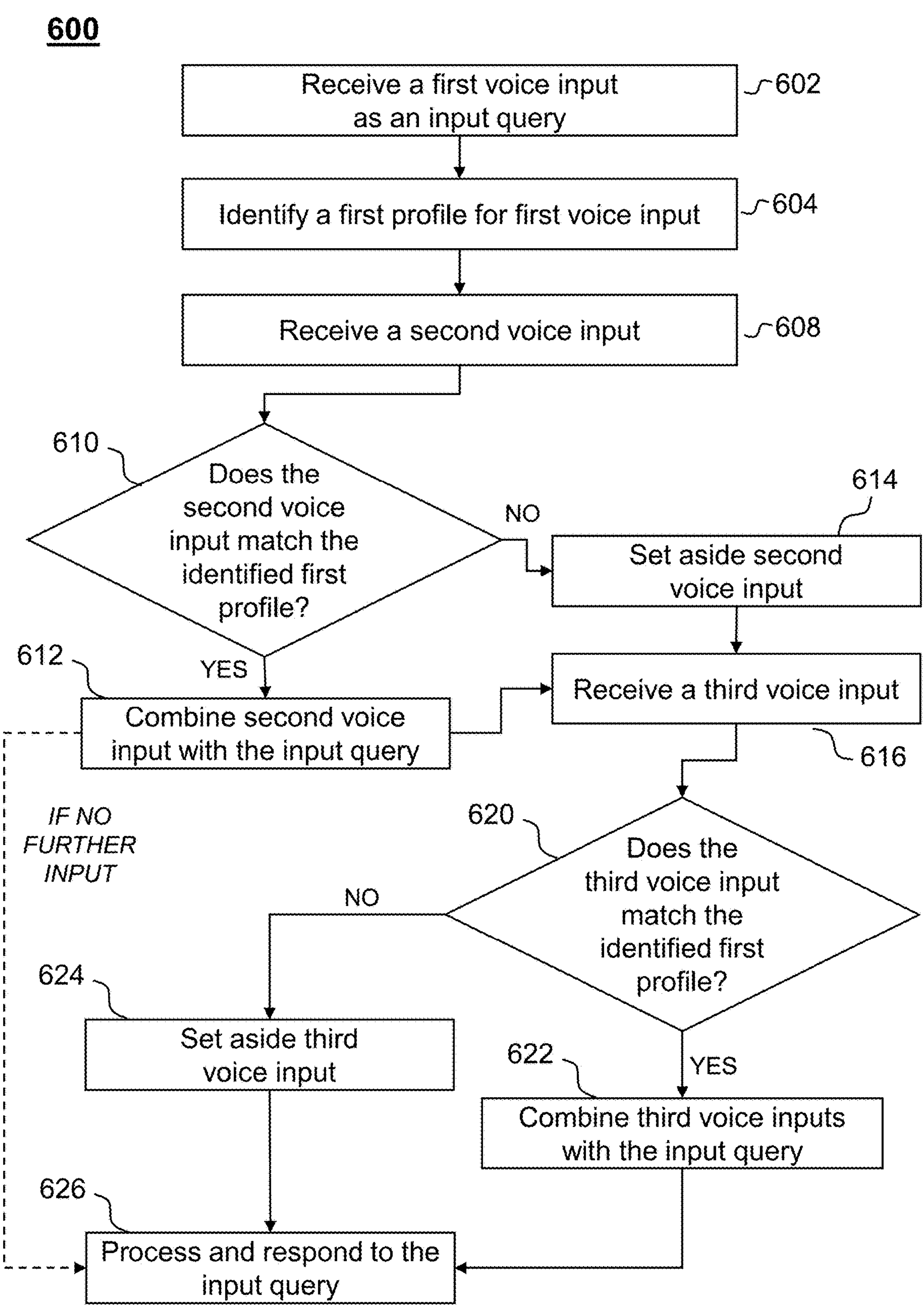
FIG. 6 depicts an illustrative flowchart of a process for determining whether to include an interruption as part of a voice query, in accordance with some embodiments of the disclosure.

In some embodiments, device 101 may determine to which request to respond and/or act. For instance, first user 110 request to play "Celebration" but second user 120 requests to play "Free Bird." Deciding which request to honor may depend on determining which user initiated the first virtual assistant request. In scenario 100, first user 110 initiated the request with wake word 112 and started request 114. In scenario 100, second user 120 interrupts first user 110 with interrupting request 122. The virtual assistant of device 101 in scenario 100 must determine whether all requests, e.g., in the voice input stream, came from one person and/or whether to discard one or more of the captured requests as interruptions. FIG. 6 depicts an exemplary process of combining and/or setting aside voice inputs for a voice query based on identifying voices.

Figure 8A:
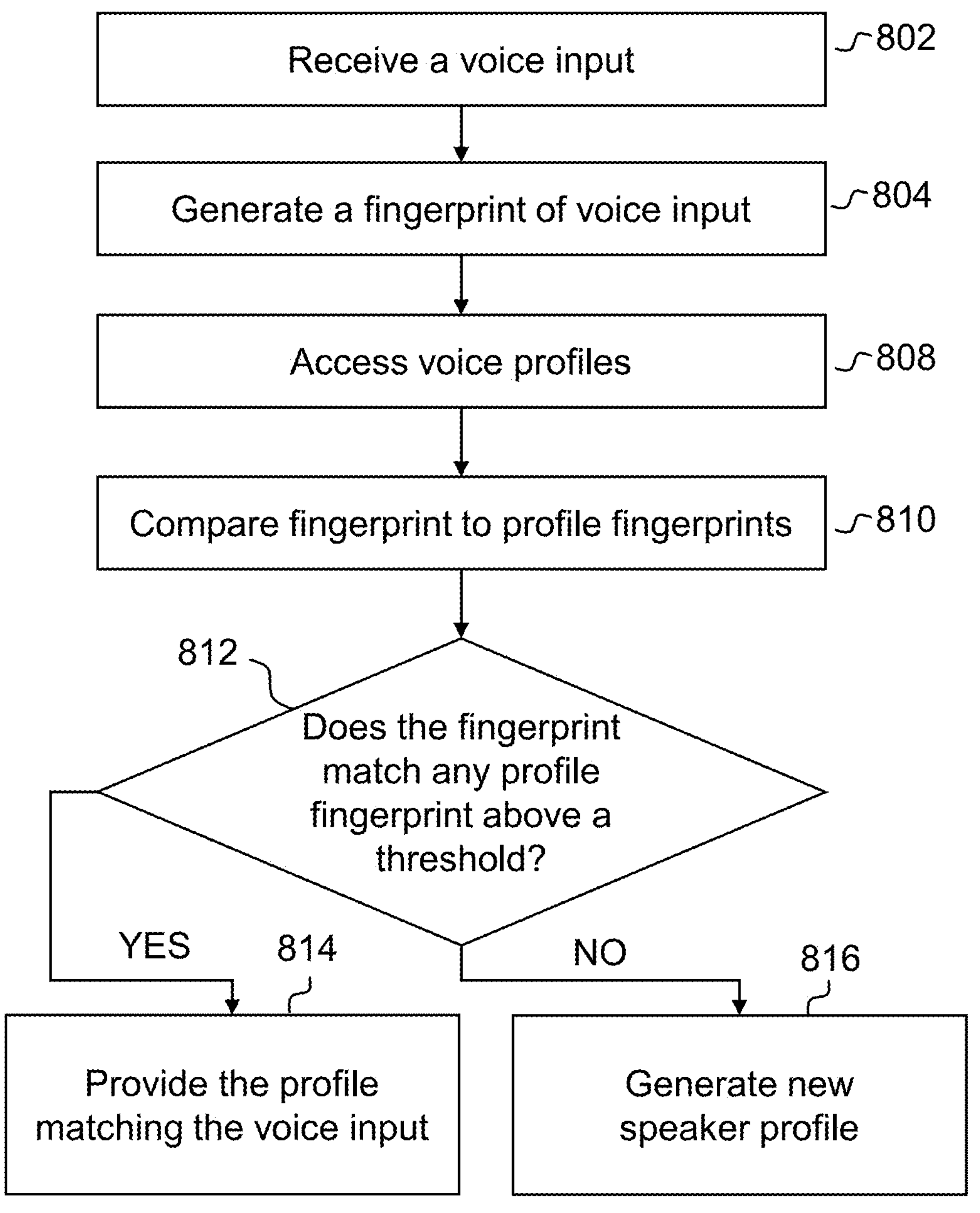
FIG. 8A depicts an illustrative flowchart of a process to determine if a voice input matches a voice profile, in accordance with some embodiments of the disclosure.
Figure 8B:
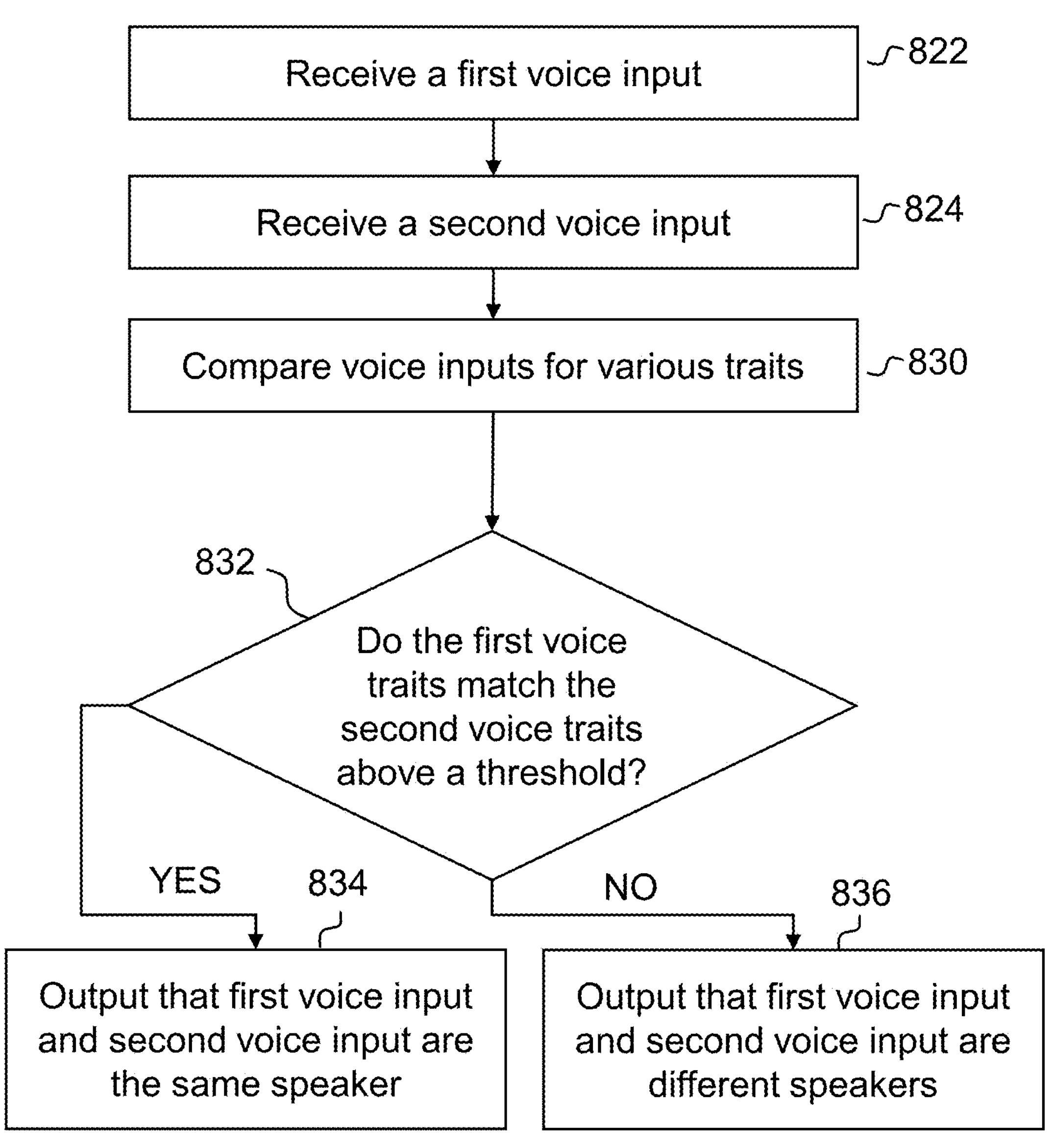
FIG. 8B depicts an illustrative flowchart of a process to determine if two voice inputs have a voice match, in accordance with some embodiments of the disclosure.

In order to correctly process the right request from an input stream and ignore an interruption, there are a few steps a virtual assistant may perform. For instance, in scenario 100, the virtual assistant of device 101 may identify that the voice input(s) by first user 110 and second user 120 are not from the same source. In some embodiments, device 101 may discard statements in the input stream made by anyone other than the user who initiated the request, e.g., first user 110. FIG. 8A depicts an exemplary process of identifying voices, and FIG. 8B depicts an exemplary process of determining if two voices are the same or different speakers.

Figure 7A:
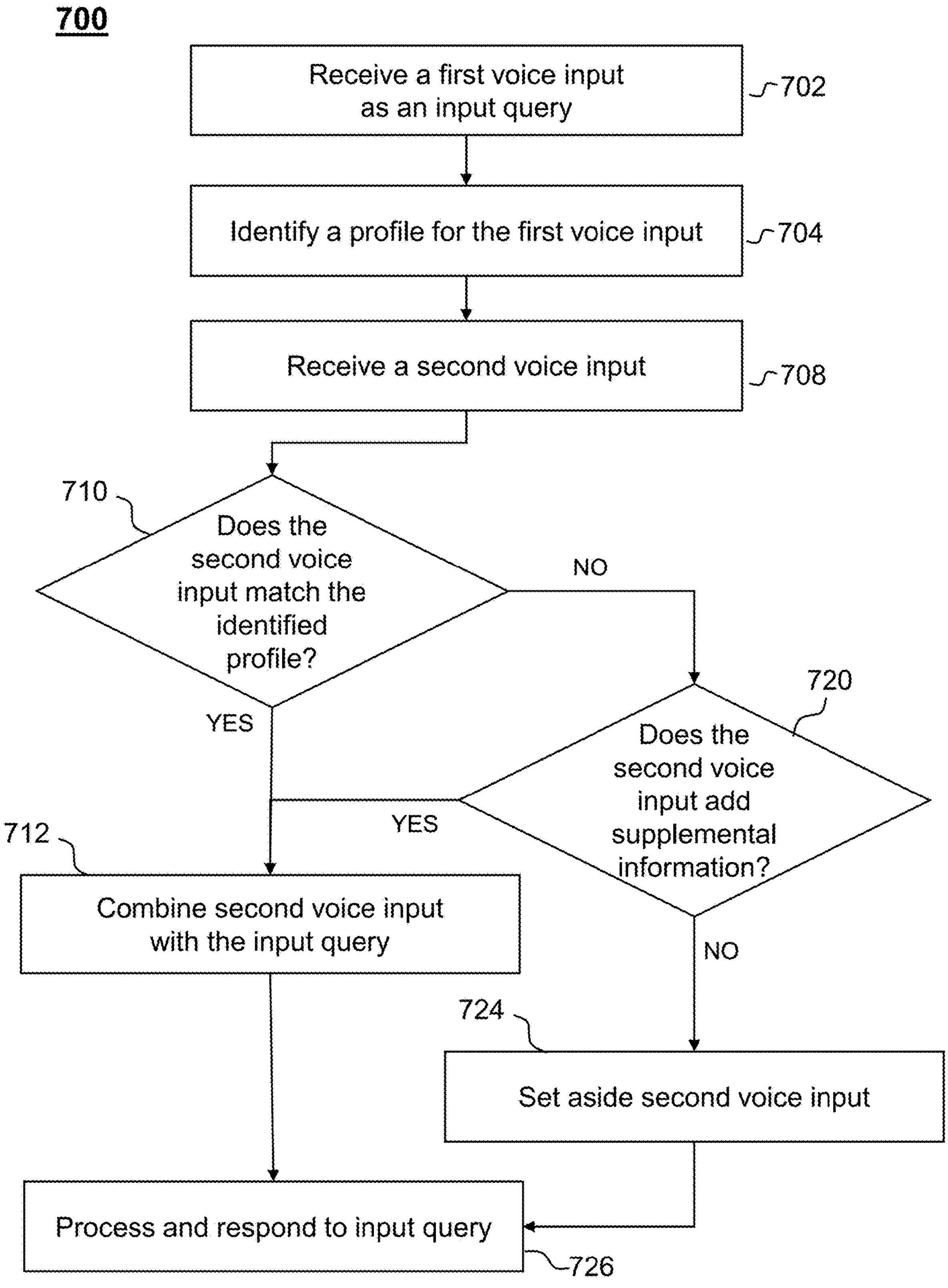
FIG. 7A depicts an illustrative flowchart of a process for determining whether to include a supplemental comment as part of a voice query, in accordance with some embodiments of the disclosure.
Figure 7B:
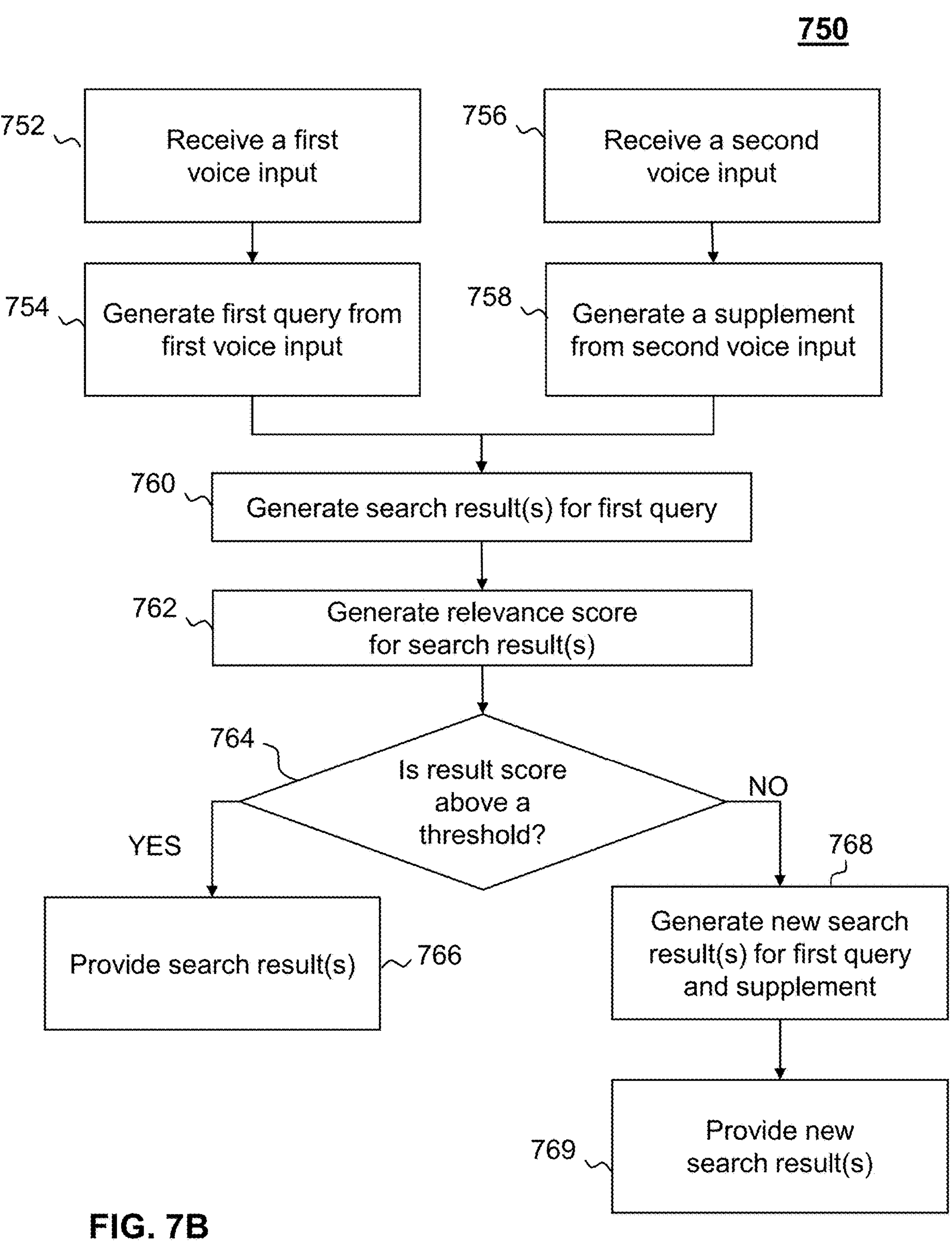
FIG. 7B depicts an illustrative flowchart of a process for determining whether to include a supplement with a voice query, in accordance with some embodiments of the disclosure.
Figure 7C:
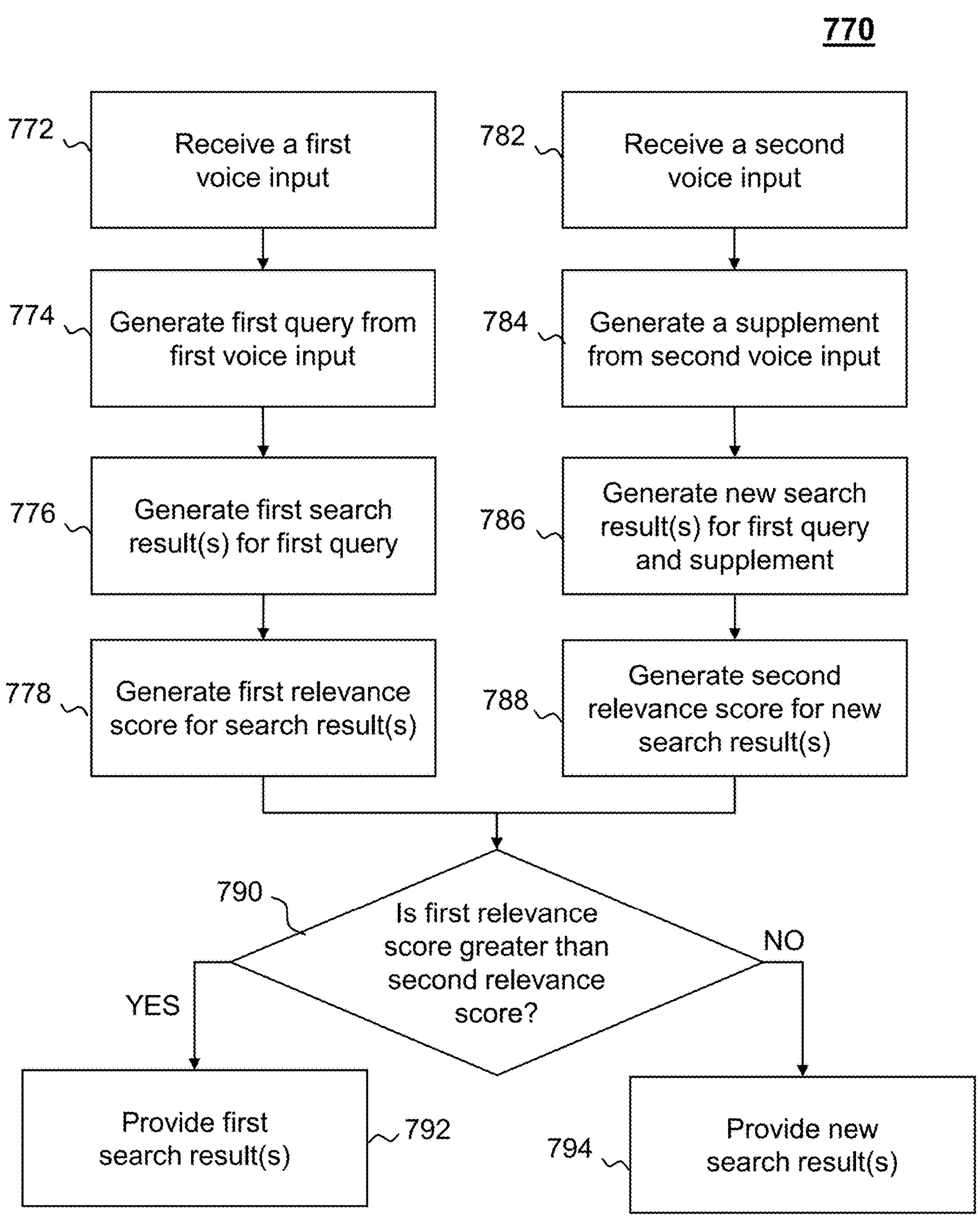
FIG. 7C depicts an illustrative flowchart of a process for determining whether to include a supplement with a voice query, in accordance with some embodiments of the disclosure.

In scenario 100, device 101 makes listen decision 124, e.g., to set aside interrupting request 122. Listen decision 124 depicts a determination to ignore interrupting request 122 and/or statements from second user 120. In scenario 100, device 101 issues virtual assistant response 126, saying, "OK. Now playing "Celebration" by Kool & The Gang," and begins to play the song, also demonstrating that interrupting request 122 is set aside and/or ignored. In some embodiments, device 101 may set aside statements made by second user 120 and/or determine if interrupting request 122 may offer supplemental information. FIGS. 7A-C depict exemplary processes of determining whether to include an additional comment/interruption as a supplement for a voice query.

Figure 1B:
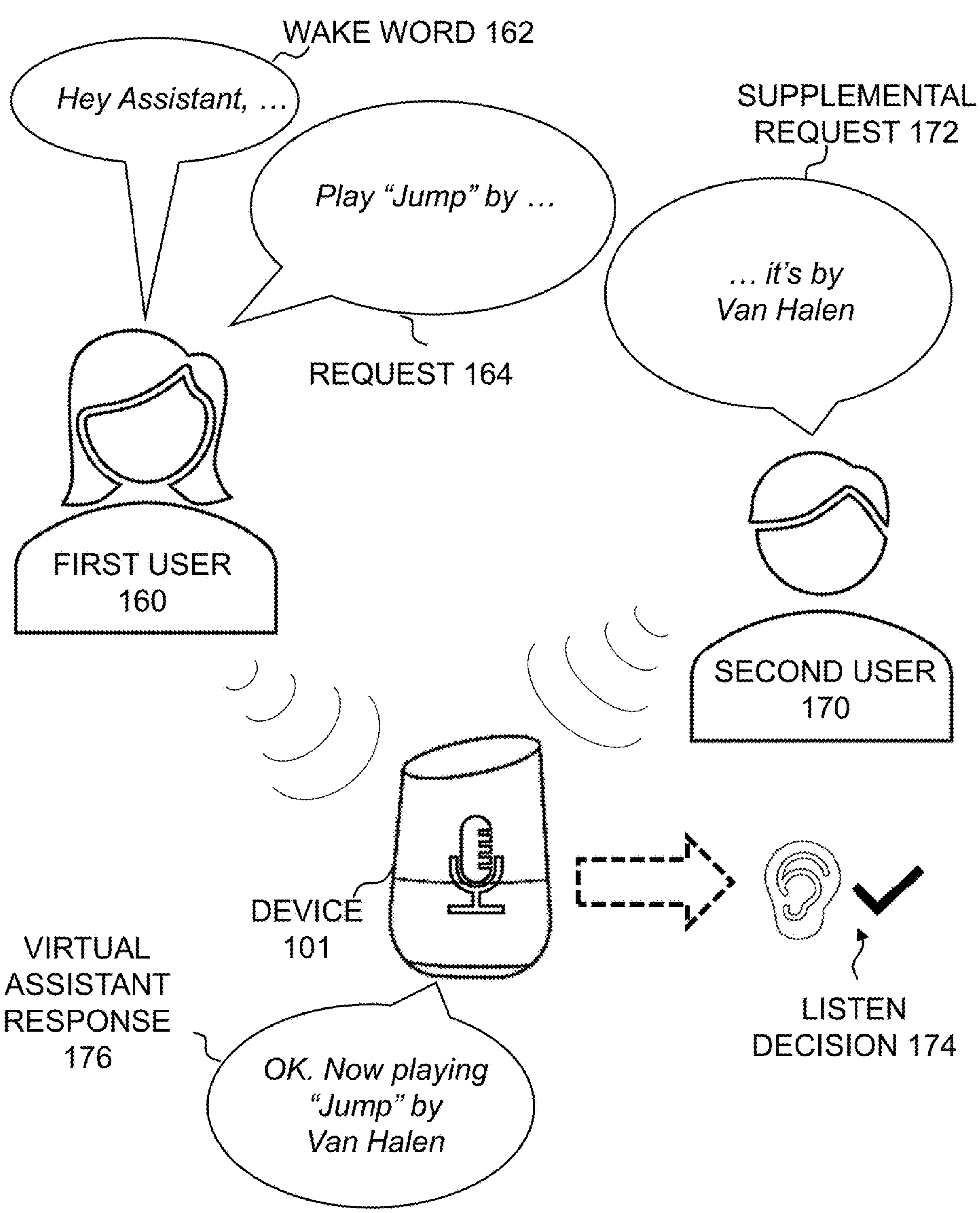
FIG. 1B illustrates an exemplary scenario of determining whether to include a supplemental comment as part of a voice query, in accordance with embodiments of the disclosure.

FIG. 1B illustrates an exemplary scenario of deciding whether to include a supplemental comment as part of a voice query, in accordance with embodiments of the disclosure. For instance, a voice query issued by a first user may be supplemented by a voice input from a second user. By way of a non-limiting example, scenario 150 of FIG. 1B illustrates device 101 capturing statements from first user 160 and second user 170. For example, a first user, e.g., the host of a party, may be requesting a song to be played and is supplemented by an interjecting party guest who can offer more information for the song, e.g., the artist of a song with a relatively ambiguous title.

In scenario 150, first user 160 and second user 170 are providing voice input to device 101. For example, each of first user 160 and second user 170 may be making a request for a virtual assistant interface of device 101, and each user may be in the same room/area or not. In some embodiments, first user 160 and/or second user 170 may each be considered a user of device 101, e.g., making queries and requests to device 101 regularly. In some embodiments, both first user 160 and second user 170 may be using device 101 for the first time.

Device 101 captures each request from first user 160 and second user 170. One or more of wake word 162, request 164, and supplemental request 172 may be captured as an input stream, e.g., to be processed by a virtual assistant. In some embodiments, device 101 automatically converts audio/voice to text for each portion of the input stream, e.g., using ASR. In some embodiments, device 101 transmits audio files to a server to convert audio/voice to text for each request. For instance, first user 160 may speak wake word 162 ("Hey Assistant, . . . ") to activate the virtual assistant on device 101. First user 160 may begin request 164, saying, "Play "Jump" by . . . " before forgetting which version of the song titled "Jump" is correct. For instance, there are at least three popular songs with the title "Jump," including a pop song by the Pointer Sisters, a hip hop song by Kriss Kross, and a rock song by Van Halen. In scenario 150, second user 170 offers a supplemental request 172, saying, " . . . it's by Van Halen." First user 160 does not say anything else in this scenario. In some embodiments, first user 160 may offer confirmation, e.g., by repeating "Van Halen" or saying, "Yes." In some embodiments, first user 160 may deny supplemental request 172 by disagreeing, canceling, or offering additional voice input for the query.

In some embodiments, device 101 may determine to which request to respond and/or act. For instance, first user 160 requests to play "Jump" and second user 170 supplements the artist "Van Halen." Deciding whether to incorporate supplemental request 172 in processing request 164 may depend on determining which user initiated the first virtual assistant request. In scenario 150, first user 160 initiated the request with wake word 162 and started request 164. In scenario 150, second user 170 supplements first user 160 with supplemental request 172. The virtual assistant of device 101 in scenario 150 must determine whether all requests, e.g., in the voice input stream, came from one person and/or whether to use a statement as a supplement (or, e.g., discard one or more of the captured requests as an interruption, as depicted in FIG. 1A). FIG. 6 depicts an exemplary process of combining and/or setting aside voice inputs for a voice query based on identifying voices.

In order to correctly process the right request from an input stream and determine whether to incorporate a potential supplement, there are a few steps a virtual assistant may perform. For instance, in scenario 150, the virtual assistant of device 101 may identify that the voice input(s) by first user 160 and second user 170 are not from the same source. In some embodiments, device 101 may discard statements in the input stream made by anyone other than the user who initiated the request, e.g., first user 160. FIG. 8A depicts an exemplary process of identifying voices and FIG. 8B depicts an exemplary process of determining if two voices are the same or different speakers. In some embodiments, device 101 may need to determine whether any supplemental comments may help a voice query.

In scenario 150, device 101 makes listen decision 174, e.g., to accept supplemental request 172. Listen decision 174 depicts a determination to listen to supplemental request 172 from second user 170. In scenario 150, device 101 issues virtual assistant response 176, saying, "OK. Now playing "Jump" by Van Halen," and begins to playback the song, also demonstrating that supplemental request 172 was incorporated. In some embodiments, device 101 may set aside statements made by second user 170 prior to determining whether supplemental request 172 may offer valuable supplemental information. FIGS. 7A-C depict exemplary processes of determining whether to include an additional comment/interruption as a supplement for a voice query. For instance, FIG. 7A depicts an illustrative flowchart of a process for deciding whether to include a supplemental comment as part of a voice query. FIG. 7B depicts an exemplary process of determining whether a first query is improper and whether supplemental information from a second voice may improve results for the initial voice query. FIG. 7C depicts an exemplary process of determining whether a set of first results for an initial voice query are better than a set of second results based on the initial voice query using supplemental voice input.

Figure 1C:
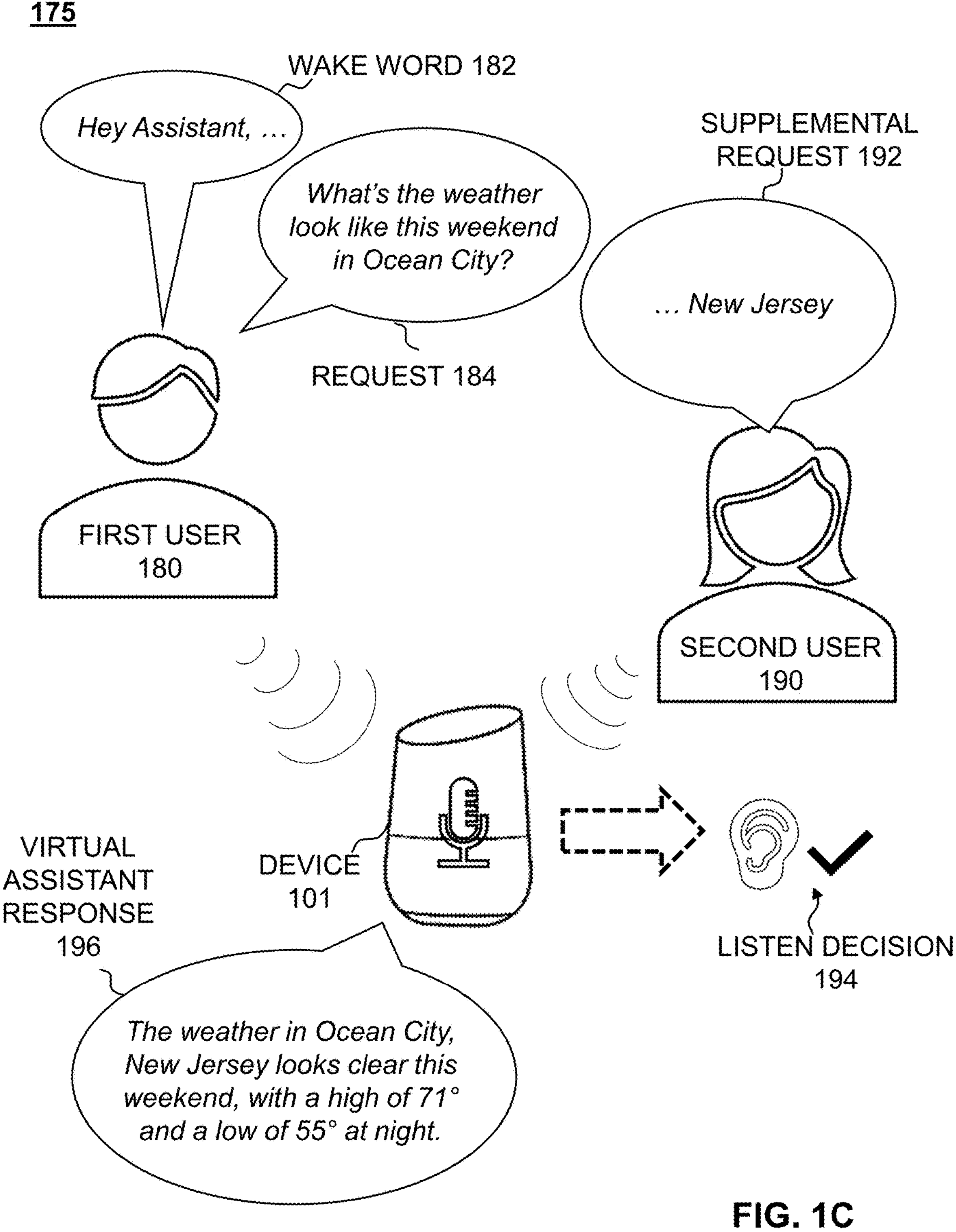
FIG. 1C illustrates an exemplary scenario of determining whether to include a supplemental comment as part of a voice query, in accordance with embodiments of the disclosure.

FIG. 1C illustrates an exemplary scenario of deciding whether to include a supplemental comment as part of a voice query, in accordance with embodiments of the disclosure. For instance, a voice query issued by a first user may be supplemented by a voice input from a second user. By way of a non-limiting example, scenario 175 of FIG. 1C illustrates device 101 capturing statements from first user 180 and second user 190. For example, a first user, e.g., someone planning a weekend trip, may be requesting weather information for a potential destination and is supplemented by an interjecting party who can offer more information for the destination, e.g., the state of the referenced town.

In scenario 175, first user 180 and second user 190 are providing voice input to device 101. For example, each of first user 180 and second user 190 may be making a request for a virtual assistant interface of device 101, and each user may be in the same room/area or not.

Device 101 captures each request from first user 180 and second user 190. One or more of wake word 182, request 184, and supplemental request 192 may be captured as an input stream, e.g., to be processed by a virtual assistant. In some embodiments, device 101 automatically converts audio/voice to text for each portion of the input stream, e.g., using ASR. In some embodiments, device 101 transmits audio files to a server to convert audio/voice to text for each request. For instance, first user 180 may speak wake word 182 ("Hey Assistant, . . . ") to activate the virtual assistant on device 101. First user 180 may begin request 184, saying, "What's the weather look like this weekend in Ocean City?" before identifying which Ocean City. For instance, there are at least five states in the United States of America with cities or towns named "Ocean City," including Maryland, New Jersey, North Carolina, Florida, and Washington. In scenario 175, second user 190 offers a supplemental request 192, saying, " . . . New Jersey." First user 180 does not say anything else in this scenario. In some embodiments, first user 180 may offer confirmation, e.g., by repeating "New Jersey" or saying, "Yes." In some other scenarios, first user 180 may deny supplemental request 192 by disagreeing, canceling, or offering additional voice input for the query, e.g., "No. the one in Maryland," but does not.

In some embodiments, device 101 may determine to which request to respond and/or act. For instance, first user 180 request to respond to the weather request in "Ocean City" and second user 190 supplements with the state "New Jersey." Deciding whether to incorporate supplemental request 192 in processing request 184 may depend on determining which user initiated the first virtual assistant request. In scenario 175, first user 180 initiated the request with wake word 182 and started request 184. In scenario 175, second user 190 supplements first user 180 with supplemental request 192. The virtual assistant of device 101 in scenario 175 must determine whether all requests, e.g., in the voice input stream, came from one person and/or whether to use a statement as a supplement (or, e.g., discard one or more of the captured requests as an interruption, like in FIG. 1A). FIG. 6 depicts an exemplary process of combining and/or setting aside voice inputs for a voice query based on identifying voices.

In order to correctly process the right request from an input stream and determine whether to incorporate a potential supplement, there are a few steps a virtual assistant may perform. For instance, in scenario 175, the virtual assistant of device 101 may identify that the voice input(s) by first user 180 and second user 190 are not from the same source. In some embodiments, device 101 may discard statements in the input stream made by anyone other than the user who initiated the request, e.g., first user 180. FIG. 8A depicts an exemplary process of identifying voices and FIG. 8B depicts an exemplary process of determining if two voices are the same or different speakers. In some embodiments, device 101 may need to determine whether any supplemental comments may help a voice query.

In scenario 175, device 101 makes listen decision 194, e.g., to accept supplemental request 192. Listen decision 194 depicts a determination to listen to supplemental request 192 from second user 190. In scenario 175, device 101 issues virtual assistant response 196, saying, "The weather in Ocean City, New Jersey looks clear this weekend, with a high of 71° and a low of 55° at night," demonstrating that supplemental request 192 was incorporated. In some embodiments, device 101 may set aside statements made by second user 190 prior to determining whether supplemental request 192 may offer valuable supplemental information. FIGS. 7A-C depict exemplary processes of determining whether to include an additional comment/interruption as a supplement for a voice query. For instance, FIG. 7A depicts an illustrative flowchart of a process for deciding whether to include a supplemental comment as part of a voice query. FIG. 7B depicts an exemplary process of determining whether a first query is improper and whether supplemental information from a second voice may improve results for the initial voice query. FIG. 7C depicts an exemplary process of determining whether a set of first results for an initial voice query are better than a set of second results based on the initial voice query using supplemental voice input.

Figure 2:
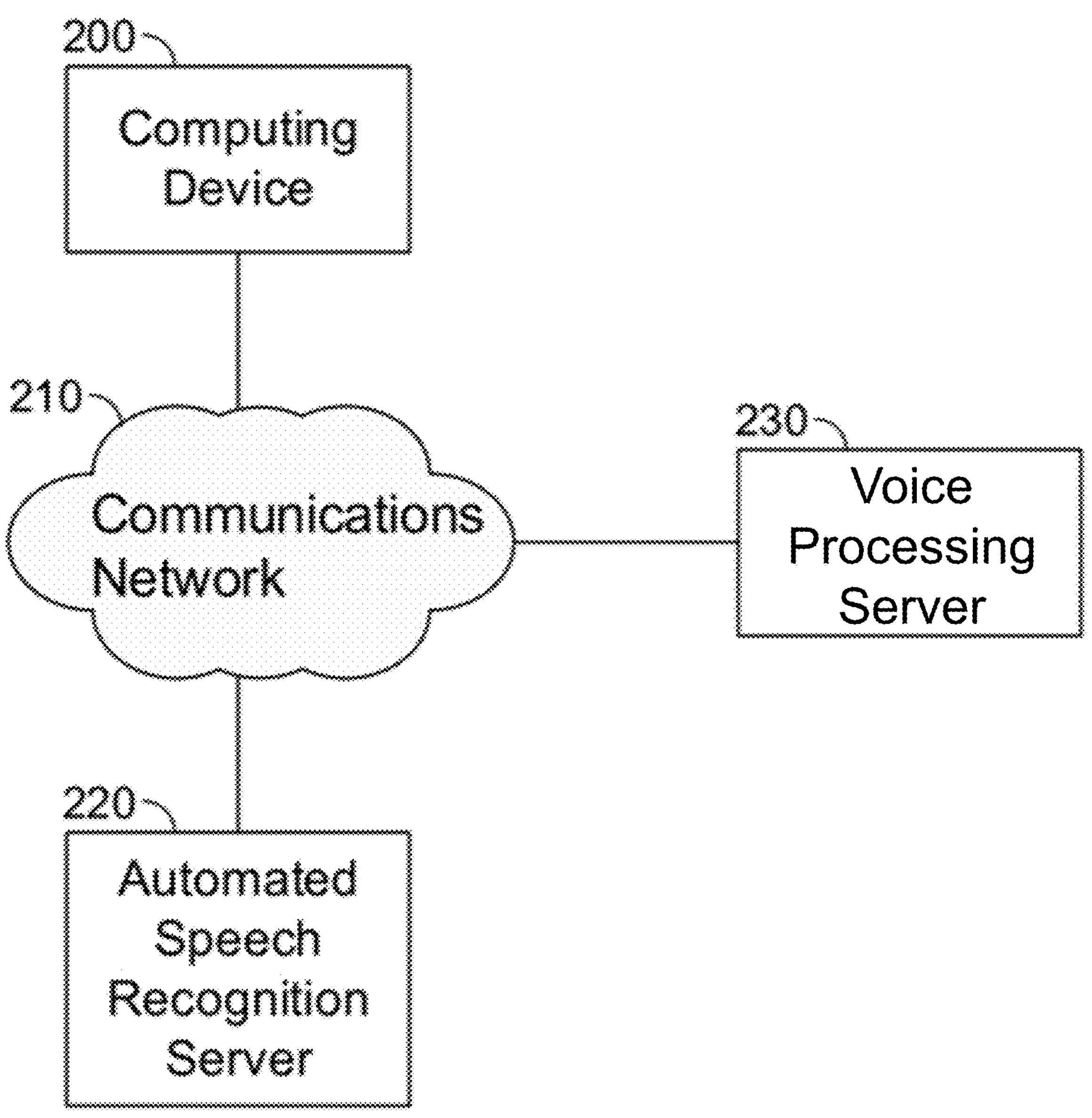
FIG. 2 is a diagram of an illustrative system for implementing processes of voice processing in accordance with embodiments of the disclosure.

FIG. 2 is a diagram of an illustrative system for implementing processes of voice processing in accordance with embodiments of the disclosure. For instance, such a system may perform voice identification/differentiation, determination of interrupting and supplemental comments, and processing of voice queries. A computing device 200 may be in communication with an ASR server 220 through, for example, a communications network 210. ASR server 220 is also in electronic communication with voice processing server 230 also through, for example, the communications network 210. Computing device 200 may be any computing device running a user interface, such as a voice assistant, voice interface allowing for voice-based communication with a user, or an electronic content display system for a user. Examples of such computing devices are a smart home assistant similar to a Google Home® device or an Amazon® Alexa® or Echo® device, a smartphone or laptop computer with a voice interface application for receiving and broadcasting information in voice format, a set-top box or television running a media guide program or other content display program for a user, or a server executing a content display application for generating content for display to a user. ASR server 220 may be any server running an ASR application. Voice processing server 230 may be any server programmed to process one or more voice inputs in accordance with embodiments of the disclosure, and to process voice queries with the ASR server 220. For example, voice processing server 230 may be a server programmed to identify a voice, determine interruptions and supplements, and process voice queries input into computing device 200.

Figure 3:
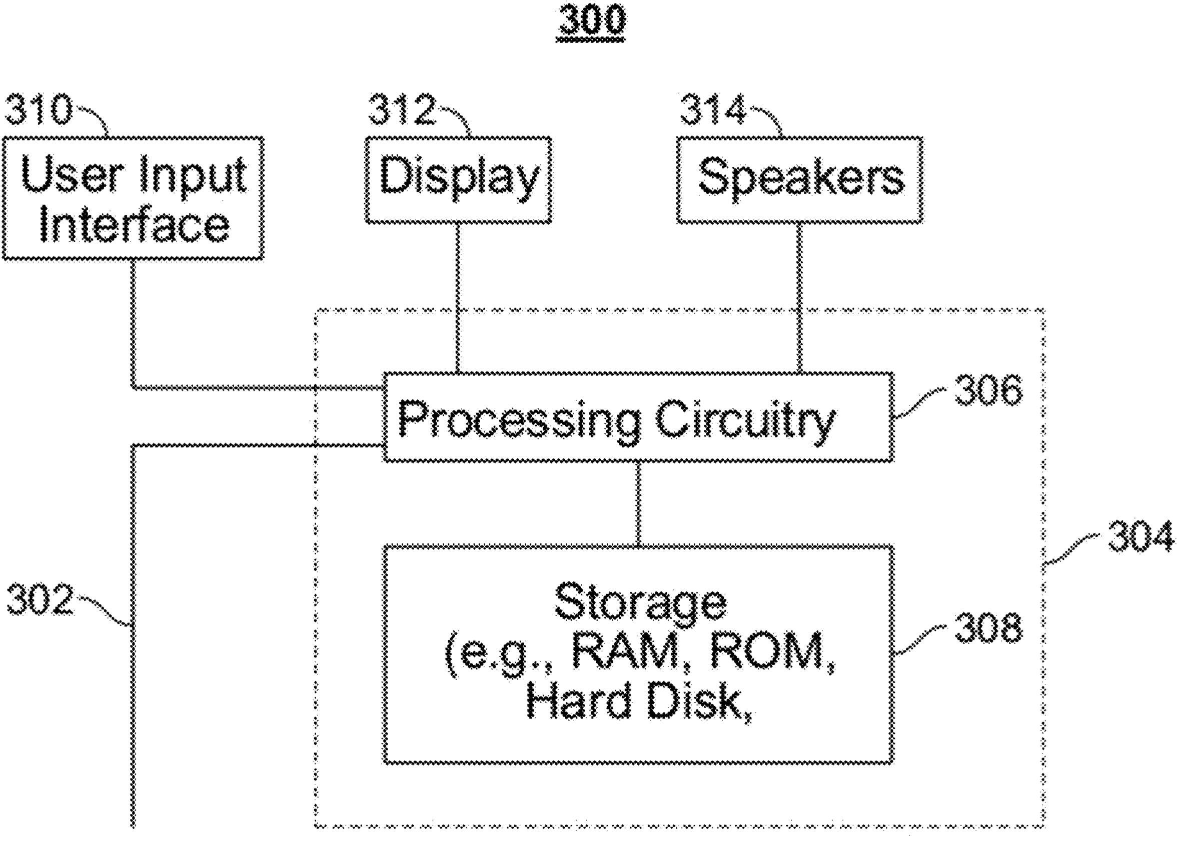
FIG. 3 is a diagram of illustrative electronic computing devices constructed for use according to embodiments of the disclosure.

The computing device 200, e.g., device 100, may be any device capable of acting as a voice interface system such as by running one or more application programs implementing voice-based communication with a user, and engaging in electronic communication with server 230. For example, computing device 200 may be a voice assistant, smart home assistant, digital TV, laptop computer, smartphone, tablet computer, or the like. FIG. 3 shows a generalized embodiment of an illustrative user equipment device 300 that may serve as a computing device 200. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for receiving streamed content and executing its display, such as executing application programs that provide interfaces for content providers to stream and display content on display 312.

Control circuitry 304 may thus include communications circuitry suitable for communicating with a content provider 140 server or other networks or servers. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other.

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage may be used to supplement storage 308 or instead of storage 308.

Storage 308 may also store instructions or code for an operating system and any number of application programs to be executed by the operating system. In operation, processing circuitry 306 retrieves and executes the instructions stored in storage 308, to run both the operating system and any application programs started by the user. The application programs can include one or more voice interface applications for implementing voice communication with a user, and/or content display applications which implement an interface allowing users to select and display content on display 312 or another display.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be included. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

Figure 4:
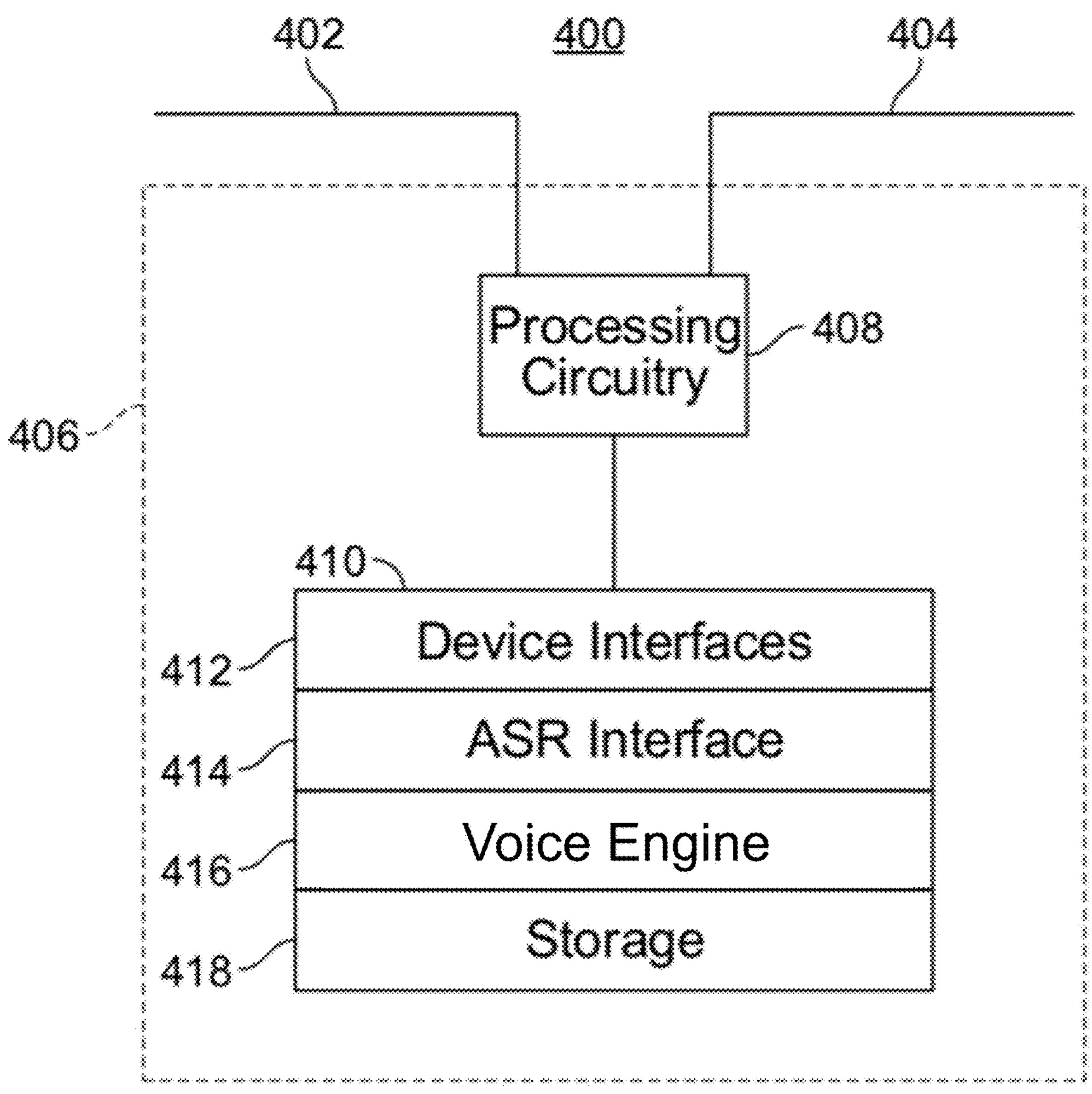
FIG. 4 is a diagram of an illustrative voice processing server constructed for use according to embodiments of the disclosure.

FIG. 4 is a generalized embodiment of an illustrative voice processing server 230 constructed for use according to embodiments of the disclosure. Here, device 400 may serve as a voice processing server. Device 400 may receive content and data via I/O paths 402 and 404. I/O path 402 may provide content and data to the various content consumption devices 110 and 130, while I/O path 404 may provide data to, and receive content from, one or more content providers 140. Like the user equipment device 300, the device 400 has control circuitry 406 which includes processing circuitry 408 and storage 410. The control circuitry 406, processing circuitry 408, and storage 410 may be constructed, and may operate, in similar manner to the respective components of user equipment device 300.

Storage 410 is a memory that stores a number of programs for execution by processing circuitry 408. In particular, storage 410 may store a number of device interfaces 412, an ASR interface 414, voice engine 416 for processing voice inputs via device 200 and selecting voice profiles therefrom, and storage 418. The device interfaces 412 are interface programs for handling the exchange of commands and data with the various devices 200. ASR interface 414 is an interface program for handling the exchange of commands with and transmission of voice inputs to various ASR servers 220. A separate interface 414 may exist for each different ASR server 220 that has its own format for commands or content. Voice engine 416 includes code for executing all of the above-described functions for processing voice inputs, identifying and/or differentiating voice inputs, determining interruptions, determining supplemental information, and sending one or more portions of a voice input to ASR interface 414 for transmission to ASR server 220. Storage 418 is memory available for any application and is available for storage of terms or other data retrieved from device 200, such as voice profiles, or the like.

The device 400 may be any electronic device capable of electronic communication with other devices and accepting voice inputs. For example, the device 400 may be a server, or a networked in-home smart device connected to a home modem and thereby to various devices 200. The device 400 may alternatively be a laptop computer or desktop computer configured as above.

ASR server 220 may be any server configured to run an ASR application program and may be configured similar to server 400 of FIG. 4 with the exception of storing one or more ASR modules in memory 410 rather than device interfaces 412, ASR interface 414, and voice engine 416.

FIG. 5 depicts an illustrative data structure for voice profiles, in accordance with some embodiments of the disclosure. In some embodiments, a set of voice profiles may be a first-in-first-out (FIFO) data structure where a new profile is added and/or the most recently accessed profile is reorganized to be quickly accessible at the top of the structure. Some embodiments may use data structures that comprise hierarchical data structures, trees, linked lists, queues, playlists, matrices, tables, blockchains, text files, programming objects, and/or various other data structures. FIG. 5 depicts an illustrative data structure in profile data structure 500.

Profile data structure 500 comprises multiple profiles such as profiles 510, 520, 530, 540, 550, 560, and 570. Voice identification (ID) numbers in profile data structure 500 may be populated with ID numbers. Each profile of profile data structure 500 has fields, such as fields 562-568. For instance, profile 560 has a voice ID 562 of "VOICE ID N," language 564 as "en-US" for U.S.-based English, demographic 565 as "adult female," voice fingerprint 566 of "voice fingerprint N," and timestamp 568 of "2021-06-29 2:47 PM." Timestamp 568 is the most recent of the timestamps while timestamp 518 is the oldest. In some embodiments, a timestamp indicates creation date. In some embodiments, a timestamp indicates the date and time of last use of the profile. In some embodiments, the profile database may be governed by an expiration time (e.g., three months, one year, etc.), and each profile may be deleted at a certain point after the corresponding timestamp if there is insufficient use. For instance, timestamp 518 of phrase 510 indicates "2021-06-09 10:18 AM." If profile data structure 500 has an expiration timer of, e.g., six months, then phrase 510 would be deleted on Dec. 9, 2021, if there is no additional use.

FIG. 6 depicts an illustrative flowchart of a process for deciding whether to include an interruption in a voice input stream as part of a voice query, in accordance with some embodiments of the disclosure. A voice input stream captured by a virtual voice assistant may include one or more voice inputs, e.g., as queries, requests, interruptions, supplements, etc. There are many ways to determine whether to ignore or add an interruption to a voice query, and process 600 of FIG. 6 is an exemplary method.

Some embodiments may utilize a voice engine to perform one or more parts of process 600, e.g., as part of an ASR platform or interactive virtual assistant application, stored and executed by one or more of the processors and memory of a device and/or server such as those depicted in FIGS. 2-4. For instance, a voice engine (or voice identification engine) may run on a server of a computing device, ASR server, and/or voice processing server. A voice engine may run on a component of a computing device with a virtual assistant, e.g., speaker, microphone, television, set-top box, computer, smartphone, tablet, or other devices. A voice engine may be network-connected and work in conjunction with one or more voice processing servers, speech recognition servers, and/or other cloud applications performing necessary functions for voice queries. In some embodiments, portions of this process may be performed locally, and other portions may be performed remotely. For instance, receiving a "wake word" may be performed locally, and further input of, e.g., a voice query or command, may be processed by remote voice servers.

At step 602, a voice engine receives a first voice input as an input query, e.g., for a voice query to be processed. For instance, the voice engine (e.g., in conjunction with an ASR engine) may determine text and/or keywords based on a first voice input as the input query. A voice engine may capture an input stream that comprises multiple inputs, e.g., from one or more voices. In some embodiments, portions of an input stream may be processed as separate inputs. In some embodiments, a virtual assistant may receive a wake word and a query as a first voice input, e.g., as part of a captured input stream, to be set as the input query. In scenario 100 of FIG. 1A, wake word 112 and request 114 may be considered a first voice input separately or together. In some embodiments, a wake word may be a first voice input, e.g., for purposes of voice identification, but the wake word may be generally ignored when processing the query. In some embodiments, only the request, such as request 114 of FIG. 1A, may be considered the first voice input that becomes the input query.

At step 604, the voice engine identifies a first profile for the first voice input. For example, the user who initiates the virtual assistant may be identified and/or assigned a profile. The first voice to issue voice input may be identified as the primary voice input (e.g., first voice profile) for the query. In some embodiments, interrupting voices may be assigned as "interrupters," "supplemental," and/or secondary voices. In scenario 100 of FIG. 1A, request 114 may be identified as spoken by first user 110 and, e.g., first user 110 may be assigned as the first profile. In some embodiments, each user of the virtual assistant may have a user profile, e.g., as depicted in FIG. 5. In some embodiments, the identified voice profile is the closest approximation of available voice profiles. For instance, a guest may be assigned a voice profile of a regular user based on, e.g., similarity to the sound of his or her voice. In some embodiments, a new voice may be identified as a guest voice and, e.g., associated with a new profile, a guest profile, and/or one of a plurality of default guest profiles. In some embodiments, a voice may be associated with a default voice profile such as adult male, adult female, male child, female child, senior male, senior female, deep-voiced adult, high-pitched adult, etc. FIGS. 8A and 8B depict exemplary processes of identifying voices.

At step 608, the voice engine receives a second voice input, e.g., as part of the input stream. For instance, a second voice command or query may be provided to a virtual assistant. In some embodiments, a second voice input may be provided by a different user from the one who provided the first voice input, e.g., a person who interrupts and/or provides supplemental comments. For instance, the second voice input may detrimentally interrupt the voice query or may positively supplement the initial query. In some cases, the second voice input may be an interruption and not helpful with the first query. For instance, FIG. 1A depicts interrupting request 122 as a second voice input. In some cases, the second voice input may be provided by a different user who may be, e.g., supplementing the query. For example, FIG. 1B depicts supplemental request 172 as a second voice input and FIG. 1C depicts supplemental request 192 as a second voice input. In some cases, the second voice input may be provided by the same user, e.g., following a brief pause after the first voice input.

At step 610, the voice engine determines whether the second voice input matches the identified profile. In some embodiments, a voice profile may be assigned to the second voice input, e.g., following step 604. In some embodiments, the second voice input may be compared with the first voice input to determine if the same user provided both inputs. FIG. 8A depicts an exemplary process of identifying voices and FIG. 8B depicts an exemplary process of determining if two voices are the same or different speakers.

If, at step 610, the voice engine determines the second voice input matches the identified first profile then, at step 612, the voice engine combines the second voice input with the input query (e.g., the first voice input). For instance, there might be a slight pause between two utterances by a first user that were intended to be one statement or query submitted to a voice assistant. In FIG. 1A, wake word 112 and request 114 may be considered matches that should be combined. Similarly, in FIG. 1B, wake word 162 and request 164 may be considered matches that should be combined together and, in FIG. 1C, wake word 182 and request 184 may be considered matches that should be combined together. Also, in FIG. 1A, request 114 and request 116 may be considered matches that should be combined together. In some embodiments, each input may be combined as one input, e.g., one audio file to be processed. In some embodiments, each input may be converted to text, e.g., via voice recognition processes, and combined as one query input of text, keywords, and/or data. In some embodiments, after combining the second voice input with the input query (e.g., the first voice input) at step 612, the voice engine may receive a third voice input at step 616. In some embodiments, after step 612, the voice engine may not receive any further input, e.g., to the input stream, and may process and respond to the input query at step 626.

If, at step 610, the voice engine determines the second voice input and the identified first profile are not a match then, at step 614, the voice engine sets aside the second voice input from the input stream. In some embodiments the second voice input may be set aside and used as a supplemental query term if, e.g., the results for the input query fail. In some embodiments, the second voice input may be set aside and used as a supplemental query term if, e.g., the results for the input query are ambiguous, too numerous, or otherwise improper. In some embodiments, the second voice input may be discarded completely.

At step 616, the voice engine receives a third voice input. For instance, the third voice input may interrupt the voice query or may supplement the query. In some cases, the third voice input may be provided by the same user as a prior input, e.g., following a brief pause after the first voice input or the second voice input. For instance, in FIG. 1A, request 116 may be considered a third voice input that matches the voice input for request 114. In some instances, the third voice input may be provided by a different user, e.g., interrupting the query. For instance, FIG. 1B depicts interrupting request 122 as a second or third voice input that interrupts. In some cases, the third voice input may be provided by a different user than the first voice input or second voice input, e.g., supplementing the query. For instance, each of supplemental request 172 depicted in FIG. 1B and supplemental request 192 depicted in FIG. 1C may be considered a third voice input that, although different from the original voice input, may supplement the query.

At step 620, the voice engine determines whether the third voice input matches the identified first profile. In some embodiments, the second voice input may be compared with the first voice input to determine if the same user provided both inputs. FIG. 8A depicts an exemplary process of identifying voices and FIG. 8B depicts an exemplary process of identifying voices to determine if two voices are the same or different speakers.

If the voice engine determines the third voice input matches the identified first profile, then, at step 622, the voice engine combines the third voice input with the input query (e.g., the first voice input). For instance, there might be a slight pause (or interruption) between two utterances by a first user that were intended to be one statement or query submitted to a voice assistant. For instance, in FIG. 1A, request 114 and request 116 may be considered matches of a first voice input and a third voice input that should be combined together (e.g., setting aside the interrupting request). In some embodiments, each input may be combined as one input, e.g., one audio file to be processed. In some embodiments, each input may be converted to text, e.g., via voice recognition processes, and combined as one query input of text and/or data.

If the voice engine determines the third voice input does not match the identified first profile then, at step 624, the voice engine sets aside the third voice input. In some embodiments, the third voice input may be set aside and used as a supplemental query term if, e.g., the results for the input query fail or are ambiguous, too numerous, or otherwise improper. In some embodiments, the third voice input may be discarded.

At step 626, the voice engine transmits the input query for processing and response. For instance, the virtual assistant may process the input query and provide one or more results for the input query. In some embodiments, the input query may incorporate one or more parts of the voice input stream, e.g., as an audio file and/or as processed by ASR/NLP. In some instances, the input query may comprise one or more of, e.g., the wake word, the first voice input, the second voice input, and the third voice input. In some embodiments, a wake word will be removed and/or ignored. In some instances, the input query may comprise the first voice input and supplemental input from one or more of, e.g., the second voice input, and the third voice input.

FIG. 7A depicts an illustrative flowchart of a process for deciding whether to include a supplemental comment as part of a voice query, in accordance with some embodiments of the disclosure. There are many ways to determine whether to include supplement from a second voice input in a voice input stream, and process 700 of FIG. 7 is an exemplary method. Some embodiments may utilize a voice engine to perform one or more parts of process 700, e.g., as part of an ASR platform or interactive virtual assistant application, stored and executed by one or more of the processors and memory of a device and/or server such as those depicted in FIGS. 2-4.

At step 702, a voice engine receives a first voice input as an input query, e.g., for a voice query to be processed. For instance, the voice engine (e.g., in conjunction with an ASR engine) may determine text and/or keywords based on a first voice input as the input query. A voice engine may capture an input stream that comprises multiple inputs, e.g., from one or more voices. In some embodiments, portions of an input stream may be processed as separate inputs. In some embodiments, a virtual assistant may receive a wake word and a query as a first voice input, e.g., as part of a captured input stream, to be set as the input query. In scenario 100 of FIG. 1A, wake word 112 and request 114 may be considered a first voice input separately or together. In some embodiments, a wake word may be a first voice input, e.g., for purposes of voice identification, but the wake word may be generally ignored when processing the query. In some embodiments, only a request, such as request 114 of FIG. 1A, may be considered the first voice input that becomes the input query. In some embodiments, a wake word may not be necessary and the first voice input may be a request.

At step 704, the voice engine identifies a first profile for the first voice input. For example, the user who initiates the virtual assistant may be identified and/or assigned a profile. The first voice to issue voice input may be identified as the primary voice input (e.g., first voice profile) for the query. In some embodiments, interrupting voices may be assigned as "interrupters," "supplemental," and/or other secondary voices. In scenario 100 of FIG. 1A, request 114 may be identified as spoken by first user 110 and, e.g., first user 110 may be assigned as the first profile. In some embodiments, each user of the virtual assistant may have a user profile, e.g., as depicted in FIG. 5. FIGS. 8A and 8B depict exemplary processes of identifying voices.

At step 708, the voice engine receives a second voice input, e.g., as part of the input stream. For instance, a second voice command or query may be provided to a virtual assistant. In some embodiments, a second voice input may be provided by a different user than who provided the first voice input, e.g., a person who interrupts and/or provides supplemental comments. For instance, FIG. 1A depicts interrupting request 122 as a second voice input of an input stream. For example, FIG. 1B depicts supplemental request 172 as a second voice input and FIG. 1C depicts supplemental request 192 as a second voice input. In some cases, the second voice input may be provided by the same user, e.g., following a brief pause after the first voice input.

At step 710, the voice engine determines whether the second voice input matches the identified profile. In some embodiments, a voice profile may be assigned to the second voice input, e.g., following step 704. In some embodiments, the second voice input may be compared with the first voice input to determine if the same user provided both inputs. FIG. 8A depicts an exemplary process of identifying voices, and FIG. 8B depicts an exemplary process of determining if two voices are the same or different speakers.

If, at step 710, the voice engine determines the second voice input matches the identified first profile then, at step 712, the voice engine combines the second voice input with the input query (e.g., the first voice input). For instance, there might be a slight pause between two utterances by a first user that were intended to be one statement or query submitted to a voice assistant. In some embodiments, two voice inputs may already be combined, e.g., as part of the same input stream and an interruption may be removed. In FIG. 1A, request 114 and request 116 may be considered matches that should be combined together (without interrupting request 122). In some embodiments, each input may be combined or re-combined as one input, e.g., one stream or audio file to be processed. In some embodiments, each input may be converted to text, keywords, and/or other data and combined as one input to be processed. From step 712, the voice engine moves to step 726, where the input query is processed and a response/result is provided.

If, at step 710, the voice engine determines the second voice input and the identified first profile are not a match at then, at step 720, the voice engine determines whether the second voice input adds supplemental information to the input query. For instance, the voice engine (e.g., in conjunction with an ASR engine) may determine whether the text of the second voice is related to the text of the input query. In some embodiments, a second voice input may be supplemental if it filters and/or refines initial search results. In some embodiments, a machine learning model may be trained to determine similarity and/or whether two voice inputs may be considered related or supplemental to one another. In some embodiments, the voice engine may determine whether the results for the query from the first voice input fail and/or are too ambiguous, too numerous, or otherwise improper prior to evaluating whether the second voice input would improve the input query and thus, appropriately add supplemental information to the initial query. FIG. 7B depicts an exemplary process of determining whether a search query from a first voice requires supplemental information to, e.g., help refine or filter the results. In some embodiments, the second voice input may add supplemental information to the input query if the results for the voice query with the supplemental information are better—e.g., results have a higher relevance score—than the results of the initial query alone. FIG. 7B depicts an exemplary process of determining whether supplemental information from a second voice may improve results for an initial voice query. In some embodiments, the voice engine (e.g., in conjunction with an ASR engine) may determine whether the second voice input is related to the input query before evaluating if the results meet a threshold score and/or might improve with supplemental information.

If, at step 720, the voice engine determines the second voice input adds supplemental information to the input query then, at step 712, the voice engine combines the second voice input with the input query (e.g., the first voice input). In some embodiments, two voice inputs may already be combined, e.g., as part of the same input stream, and an interruption may be removed. For instance, a query and a supplement may be a part of the same input stream and the supplement may remain as part of the input stream to be processed (while any interruptions or non-relevant input may be removed).

If, at step 720, the voice engine determines the second voice input does not add supplemental information to the input query then, at step 724, the voice engine sets aside the second voice input. For instance, the second voice input may be marked as an interrupter or unrelated comment and the initial query may be used without supplement. In some embodiments, the second voice input may be removed from the voice input stream and not processed with the first input. In some embodiments the second voice input may be set aside and only used as a supplemental query term if, e.g., the results for the input query are exceedingly poor, e.g., below a very low threshold (e.g., 10-20% match). For instance, search results may be very high (e.g., hundreds or thousands) and/or even more ambiguous, numerous, or otherwise improper. In some cases, the search results might fail. In some embodiments the second voice input may be recorded, e.g., voice training, model training, profiling, etc., even though it is set aside.

At step 726, the voice engine transmits the input query for processing and response. For instance, the virtual assistant may process the input query, determine one or more keywords and/or text from the input query for search, and provide search results based on the input query. In some embodiments, the input query may incorporate one or more parts of the voice input stream, e.g., as an audio file and/or as processed by ASR/NLP. In some instances, the input query may comprise one or more of, e.g., the wake word, the first voice input, the second voice input, and the third voice input. In some embodiments, a wake word will be removed and/or ignored. In some instances, the input query may comprise the first voice input and supplemental input from one or more of, e.g., the second voice input, and the third voice input. For instance, FIGS. 7B and 7C depict exemplary processes of processing voice queries.

FIG. 7B depicts an illustrative flowchart of a process for determining whether to include a supplement with a voice query, in accordance with some embodiments of the disclosure. There are many ways to determine whether to include a supplement from a second voice input, and process 750 of FIG. 7B is an exemplary method. Some embodiments may utilize a voice engine to perform one or more parts of process 750, e.g., as part of an ASR platform or interactive virtual assistant application, stored and executed by one or more of the processors and memory of a device and/or server such as those depicted in FIGS. 2-4.

At step 752, a voice engine receives a first voice input. For instance, a first voice command or query is provided to a virtual assistant, e.g., to be processed. A voice engine may capture an input stream that comprises multiple inputs, e.g., from one or more voices. In some embodiments, portions of an input stream may be processed as separate inputs, e.g., a first voice input and a second voice input.

At step 754, the voice engine generates a first query from the first voice input. For instance, the voice engine (e.g., in conjunction with an ASR engine) may determine text and/or keywords based on the first voice input as the first query. In some embodiments, a virtual assistant may receive a wake word and a command/query as a first voice input to be set as the first query. In scenario 100 of FIG. 1A, wake word 112 and request 114 may be considered a first voice input separately or together. In some embodiments, a wake word may be a first voice input, e.g., for purposes of voice identification, but the wake word may be generally ignored when processing the query. In some embodiments, only the request, such as request 114 of FIG. 1A, may be considered the first voice input that becomes the input query.

At step 756, the voice engine receives a second voice input. For instance, a second voice command or query may be provided to a virtual assistant. In some embodiments, a second voice input may be provided by a different user from the one who provided the first voice input, e.g., a person who interrupts and/or provides supplemental comments. For instance, FIG. 1A depicts interrupting request 122 as a second voice input. For example, FIG. 1B depicts supplemental request 172 as a second voice input and FIG. 1C depicts supplemental request 192 as a second voice input. In some cases, the second voice input may be provided by the same user, e.g., following a brief pause after the first voice input.

At step 758, the voice engine generates a supplement from the second voice input. For instance, the voice engine (e.g., in conjunction with an ASR engine) may determine text and/or keywords based on the second voice input as the "supplement." A supplement may be generated when the second voice input interrupts and/or follows the first voice input. At this point, a supplement may comprise a detrimental interruption or a positive addition. Generally, in some embodiments, the supplement generated from the second voice input may be combined with the query, may be set aside and used when results for the initial query require more information, or may be discarded.

At step 760, the voice engine generates one or more search results for the first query. For instance, a virtual assistant may submit the first query to a search engine such as Google® or Bing® and receive search results for the submitted first query. In some embodiments, a virtual assistant may conduct its own search, via a network or the internet, and return search results.

At step 762, the voice engine generates a relevance score for the one or more search results. A relevancy score may be any type of determination of strength of the search results including, for instance, a score based on metrics of relevance to the query, relevance to other results, lack of ambiguity, number of irrelevant results, popularity, accessibility, redundancy in results, publish dates of results, links, interlinks, and other key search metrics. In some embodiments, a relevance score may be calculated for each result for the submitted query, e.g., as the search results are determined. For example, a search engine may rank each of the search results by a score for presentation, and a normalized score (e.g., 0-100) may be used as a relevance score for each result. In some embodiments, the normalized score of the top-ranked hit is the normalized relevance score for the set of search results. This may be helpful because many ASR platforms only return the top hit of the search results for a particular voice query. In some embodiments, a model may be trained to receive an input of search results and produce a relevance score.

In some embodiments, a weighted average of the top few (e.g., 3-5) results may be used to determine a relevance score for the set of search results for a particular query. In some embodiments, relevancy of the top few (e.g., 2-6) results with each other may be used to determine a relevance score for the set of search results for a particular query. For instance, if the results for a search on "Giants score" produces results for baseball and football, the lack of relevance among search results indicates ambiguity (and a potential need for supplemental information). In some embodiments, higher relevance scores reflect a lack of ambiguity in the search results.

In some embodiments, the search query itself may be at least a portion of the basis for a relevance score of the results. For instance, known and popular commands and queries may each have a preset high score. For example, asking a virtual assistant for the time or weather at home may be assigned a high score triggering automatic dismissal of any interruptions or supplements as unnecessary, moving to step 766. However, in some embodiments, questions may require a dynamic details that could be considered ambiguous, e.g., time or weather in a different location, a search result relevance score may be ambiguous. For instance, in FIG. 1C, asking a virtual assistant "What's the weather look like this weekend in Ocean City?" in request 184 may be ambiguous because multiple famous cities are named "Ocean City." Asking for weather in the future may be too ambiguous and require more specific times and/or dates. In such cases of ambiguous questions likely producing ambiguous search results, a relevance score may be assigned to that question to be below a predetermined threshold to ensure that supplemental information (such as a location or time, if provided) may be incorporated to filter out some ambiguity.

At step 764, the voice engine determines whether the relevance score above a predetermined threshold. For instance, with a relevance score scale of, e.g., 0-100, a threshold of 75 may indicate whether the search results are good enough and/or not based on ambiguity. In some embodiments, with a relevance score scale of, e.g., low, medium, or high, a threshold of medium may indicate whether the search results are sufficiently relevant and/or clear of ambiguity.

If the relevance score meets or exceeds the predetermined threshold then, at step 766, the voice engine provides the search result(s). For example, with a relevance score scale of, e.g., 0-100, and a threshold of 65, a relevance score of 80 would surpass the threshold. In some embodiments, one or more of the search results are passed to the virtual assistant for delivery. For instance, the top result may be read aloud by the virtual assistant. In some embodiments, one or more of the search results may be provided via an interface for the virtual assistant and/or another connected device. In some embodiments, an answer to the query may be taken as a part of one or more of the search results. In scenario 100 of FIG. 1A, request 114 and request 116 combined (e.g., "Play . . . "Celebration" by Kool & The Gang") would generally have a high relevance score that meets or exceeds the threshold.

If the relevance score is not above the predetermined threshold, then, at step 768, the voice engine generates new search result(s) based on the first query and the supplement. For instance, with a relevance score scale of, e.g., 0-100, and a threshold of 70, a relevance score of 69 would fall short of the threshold, and new results using the query and the supplement would be generated. A new search, e.g., based on the first query and the supplement, may be conducted in various ways. In some embodiments, a search with the query and the supplement may be conducted and new results produced. For instance, one or more keywords may be taken from the supplement and combined with the initial query to produce a new set of search results. In some embodiments, the initial search results from a search based on the first query may be filtered or refined using, e.g., a portion of the supplement, so that a new set of results is produced (e.g., and the top result(s) output). For instance, one or more keywords may be taken from the supplement and used to filter the initial search results and produce new search results. In some embodiments, one or more keywords may be taken from the first query and combined with the supplement to produce new search results.

At step 769, the voice engine provides the new search result(s) based on the first query and the supplement. In some embodiments, one or more of the new search results are passed to the virtual assistant for delivery. For instance, the top result of the new search may be read aloud by the virtual assistant. In some embodiments, one or more of the new search results may be provided via an interface for the virtual assistant and/or another connected device. In some embodiments, an answer to the first query (and supplement) may be taken as a part of one or more of the new search results. In some embodiments, a new relevance score may be determined for the new search results and, e.g., the new search results may only be provided if the new relevance score is greater than the relevance score for the search results for the first query. In some embodiments, if the new relevance score is not greater than the relevance score for the first query results, an error and/or request to repeat may be issued.

FIG. 7C depicts an illustrative flowchart of a process for determining whether to include a supplement with a voice query, in accordance with some embodiments of the disclosure. There are many ways to determine whether to include a supplement from a second voice input, and process 770 of FIG. 7C is an exemplary method. Some embodiments may utilize a voice engine to perform one or more parts of process 770, e.g., as part of an ASR platform or interactive virtual assistant application, stored and executed by one or more of the processors and memory of a device and/or server such as those depicted in FIGS. 2-4.

At step 772, a voice engine receives a first voice input. For instance, a first voice command or query is provided to a virtual assistant, e.g., to be processed. A voice engine may capture an input stream that comprises multiple inputs, e.g., from one or more voices. In some embodiments, portions of an input stream may be processed as separate inputs, e.g., a first voice input and a second voice input.

At step 774, the voice engine generates a first query from the first voice input. For instance, the voice engine (e.g., in conjunction with an ASR engine) may determine text and/or keywords based on the first voice input as the first query. In scenario 100 of FIG. 1A, wake word 112 and request 114 may be considered a first voice input separately or together. In some embodiments, only the request, such as request 114 of FIG. 1A, may be considered the first voice input that becomes the input query.

At step 776, the voice engine generates one or more first search results for the first query. For instance, a virtual assistant may submit the first query to a search engine such as Google® or Bing® and receive a set of first search results for the submitted first query. In some embodiments, a virtual assistant may conduct its own search, via a network or the internet, and return the first search results.

At step 778, the voice engine generates a relevance score for the one or more search results. A relevancy score may be any type of determination of strength of the search results including, for instance, a score based on metrics of relevance to the query, relevance to other results, lack of ambiguity, number of irrelevant results, popularity, accessibility, redundancy in results, publish dates of results, links, interlinks, and other key search metrics. In some embodiments, a relevance score may be calculated for each result for the submitted query, e.g., as the search results are determined. For example, a search engine may rank each of the search results by a score for presentation, and a normalized score (e.g., 0-100) may be used as a relevance score for each result. In some embodiments, the normalized score of the top-ranked hit is the normalized relevance score for the set of search results. This may be helpful because many ASR platforms only return the top hit of the search results for a particular voice query. In some embodiments, a model may be trained to receive an input of search results and produce a relevance score. In some embodiments, a weighted average of the top few (e.g., 3-5) results may be used to determine a relevance score for the set of search results for a particular query. In some embodiments, relevancy of the top few (e.g., 2-6) results with each other may be used to determine a relevance score for the set of search results for a particular query.

At step 782, the voice engine receives a second voice input. For instance, a second voice command or query may be provided to a virtual assistant. In some embodiments, a second voice input may be provided by a different user from the one who provided the first voice input, e.g., a person who interrupts and/or provides supplemental comments. For instance, FIG. 1A depicts interrupting request 122 as a second voice input. For example, FIG. 1B depicts supplemental request 172 as a second voice input, and FIG. 1C depicts supplemental request 192 as a second voice input. In some cases, the second voice input may be provided by the same user, e.g., following a brief pause after the first voice input.

At step 784, the voice engine generates a supplement from the second voice input. For instance, the voice engine (e.g., in conjunction with an ASR engine) may determine text and/or keywords based on the second voice input as the "supplement." A supplement may be generated when the second voice input interrupts and/or follows the first voice input. At this point, a supplement may comprise a detrimental interruption or a positive addition. Generally, in some embodiments, the supplement generated from the second voice input may be combined with the query, may be set aside and used when results for the initial query require more information, or may be discarded.

At step 786, the voice engine generates one or more new search results for the first query and the supplement. A new search, e.g., based on the first query and the supplement, may be conducted in various ways. In some embodiments, a search with the query and the supplement may be conducted and new results produced. For instance, one or more keywords may be taken from the supplement and combined with the initial query to produce a new set of search results. In some embodiments, the initial search results from a search based on the first query may be filtered or refined using, e.g., a portion of the supplement so that a new set of results is produced (e.g., and the top result(s) output). For instance, one or more keywords may be taken from the supplement and used to filter the initial search results and produce new search results. In some embodiments, one or more keywords may be taken from the first query and combined with the supplement to produce new search results.

At step 790, the voice engine determines whether the first relevance score is greater than the second relevance score. For instance, with a relevance score scale of, e.g., 0-100, a first score of 67 may indicate the first search results are good, but a new relevance score of 73 may indicate that the new search result(s) are better. In some embodiments, with a relevance score scale of, e.g., low, medium, or high, a first score of high may indicate a better search than with a supplement/interruption with a relevance score of low. In some embodiments, if the new relevance score is not greater than the relevance score for the first query results by a certain percentage or threshold, an error and/or request to repeat the query or queries may be issued.

If the first relevance score is greater than the second relevance score then, at step 792, the voice engine provides the first search result(s). For example, with a relevance score scale of, e.g., 0-100, a first relevance score of 85 and a second relevance score of 65, the initial search results are probably more accurate than the results based on the supplement. In some embodiments, one or more of the first search results are passed to the virtual assistant for delivery. For instance, the top result may be read aloud by the virtual assistant. In some embodiments, one or more of the search results may be provided via an interface for the virtual assistant and/or another connected device. In some embodiments, an answer to the first query may be taken as a part of one or more of the first search results. In scenario 100 of FIG. 1A, request 114 and request 116 combined (e.g., “Play . . . “Celebration” by Kool & The Gang”) would generally have a higher relevance score than a search with that request and interrupting request 122 (e.g., “C"mon, play “Free Bird” by Skynyrd!”). In some cases, like scenario 100, additional supplemental information that could improve the search to “Play . . . “Celebration” . . . ” might comprise, e.g., a specific version of the song and/or a source.

If, at step 790, the second relevance score is greater than the first relevance, score then, at step 794, the voice engine provides the new search result(s) based on the first query and the supplement. In some embodiments, one or more of the new search results are passed to the virtual assistant for delivery. For instance, the top result of the new search may be read aloud by the virtual assistant or provided via an interface. In some embodiments, an answer to the first query (and supplement) may be taken as a part of one or more of the new search results. In scenario 150 of FIG. 1B, a relevance score for request 164 (e.g., “Play “Jump” by . . . ”) will generally not score as high as a search for that request along with supplemental request 172 (e.g., “ . . . it’s by Van Halen”), which will help to disambiguate which song. Likewise, in scenario 175 of FIG. 1C, a relevance score for request 184 (e.g., “What’s the weather look like this weekend in Ocean City?”) will generally not score as high as a search for that request along with supplemental request 192 (e.g., “ . . . New Jersey”), which will help to clarify that the subject city is Ocean City, New Jersey.

FIG. 8A depicts an illustrative flowchart of a process to determine if a voice input matches a voice profile, in accordance with some embodiments of the disclosure. There are many ways to determine a match between a voice input and a profile, and process 800 of FIG. 8A is an exemplary method. Some embodiments may utilize a voice engine to perform one or more parts of process 800, e.g., as part of an ASR platform or interactive virtual assistant application, stored and executed by one or more of the processors and memory of a device and/or server such as those depicted in FIGS. 2-4. Voice identification and/or verification may be performed in several ways, e.g., in order to distinguish voice queries from interruptions, supplements, and/or background noise.

At step 802, a voice engine receives a voice input. For instance, a voice command or query is provided to a virtual assistant, e.g., to be processed. In some embodiments, an interruption or supplemental comment may be provided to a virtual assistant, e.g., to be profiled and/or matched to a profile. A voice engine may capture an input stream that comprises multiple inputs, e.g., from one or more voices. In some embodiments, portions of an input stream may be processed as separate inputs, e.g., a first voice input, et al.

At step 804, the voice engine generates a fingerprint—e.g., a “voiceprint,” a “voice fingerprint,” or a “voice template”—of the voice input. A voice fingerprint is a typical way to perform voice recognition. For instance, each voice may have a fingerprint. Voice fingerprints may be used, e.g., for identification, security, and other biometric applications. In some embodiments, a fingerprint may be a mathematical expression of a person’s voice or vocal tract. A voice fingerprint may be developed from a few phrases. In some embodiments, an initial voice fingerprint may be developed based on an initial training session. In some embodiments, many voice fingerprints may be generated for a user which may be merged together, e.g., with an initial voice fingerprint, for higher accuracy. In some embodiments, a voice fingerprint may be stored as a hash value.

At step 808, the voice engine accesses voice profiles, e.g., in a database. For instance, the voice engine may access a database of voice profiles with each unique voice profile having a fingerprint. An exemplary voice database is depicted in FIG. 5. In some embodiments, a database may include default voice profiles such as adult male, adult female, male child, female child, senior male, senior female, deep-voiced adult, high-pitched adult, etc. In some embodiments, a new voice may be identified as a guest voice and, e.g., stored in a database as a new profile, a guest profile, and/or one of a plurality of default guest profiles.

At step 810, the voice engine compares the fingerprint to profile fingerprints. For instance, with voice identification the voice fingerprint in question may be compared to each available voice fingerprint in the database to find a match, if it exists. In some embodiments, a new voice fingerprint may be correlated with each voice fingerprint in the database and a match score (e.g., 0-100 scale) may be produced based on the confidence of the match. Generally, if the match score is above a predetermined confidence threshold, a profile match is said to exist. In some embodiments, the voice database may be organized to expedite matching by, e.g., clustering similar voice fingerprints based on similar voice traits. In some embodiments, a machine learning model may be trained to receive a voice input and produce a match from a database of voice fingerprints. For instance, a training set of voices and profiles may be used to train, test, and retrain a model that predicts a voice identification for each provided new voice input.

At step 812, the voice engine determines whether the fingerprint matches any profile fingerprint, e.g., with a match score above a confidence threshold. For instance, if the match score between the fingerprint of a new voice input and a profile fingerprint is above a predetermined confidence threshold, a profile match is said to exist and a voice identified. In some embodiments, the confidence threshold may be low (e.g., 55 on a scale of 0-100). For instance, sometimes the voice engine aims to quickly differentiate speakers and determine if an assumed interruption or supplemental comment comes from the same speaker or a new person. In such cases, quick, lower-confidence matching might be more efficient than, e.g., using a confidence threshold for a match required for digital security.

If, at step 812, the fingerprint matches a profile fingerprint (e.g., a match score that meets or exceeds the confidence threshold) then, at step 814, the voice engine provides the profile matching the voice input.

If, at step 812, the fingerprint does not match a profile fingerprint (e.g., no match scores above the confidence threshold) then, at step 816, the voice engine generates new voice profile. In such cases, a new voice profile may be used to, e.g., differentiate voices that may be offering commands and queries from voices offering interruptions and/or supplemental information.

FIG. 8B depicts an illustrative flowchart of a process to determine if two voice inputs match, in accordance with some embodiments of the disclosure. There are many ways to determine a match between two voice inputs, and process 820 of FIG. 8B is an exemplary method. Some embodiments may utilize a voice engine to perform one or more parts of process 820, e.g., as part of an ASR platform or interactive virtual assistant application, stored and executed by one or more of the processors and memory of a device and/or server such as those depicted in FIGS. 2-4.

At step 822, a voice engine receives a first voice input. For instance, a voice command or query may be provided to a virtual assistant, e.g., to be processed. A voice engine may capture an input stream that comprises multiple inputs, e.g., from one or more voices. In some embodiments, portions of an input stream may be processed as separate inputs, e.g., a first voice input and a second voice input. In some embodiments, a request, such as request 114 of FIG. 1A, may be considered the first voice input, which becomes the input query.

At step 824, the voice engine receives a second voice input. For instance, a second voice command or query may be provided to a virtual assistant. In some embodiments, an interruption or supplemental comment may be provided to a virtual assistant, e.g., to be profiled and/or matched to a profile. In some embodiments, a second voice input may be provided by a different user from the one who provided the first voice input, e.g., a person who interrupts and/or provides supplemental comments. For instance, FIG. 1A depicts interrupting request 122 as a second voice input. For example, FIG. 1B depicts supplemental request 172 as a second voice input and FIG. 1C depicts supplemental request 192 as a second voice input. In some cases, the second voice input may be provided by the same user, e.g., following a brief pause after the first voice input.

At step 830, the voice engine compares the first voice input with the second voice input for various traits, e.g., acoustic metrics. For instance, the voice engine may compare one or more acoustic traits such as pitch, tone, resonance, amplitude, loudness, etc. In some cases, the voice engine may compare loudness and/or amplitude to determine if the first voice input and the second voice input came from a similar distance from the microphone prior to analyzing other voice traits. Some embodiments may be able to differentiate voices quickly based on volume before looking at other traits like, e.g., pitch, timbre, echo, etc. In some embodiments, one or more traits may be measured and/or depicted mathematically (e.g., using a graphic equalizer) and compared. In some embodiments, a sound match score may be determined based on a comparison of one or more of acoustic traits such as pitch, timbre, echo, etc.

At step 832, the voice engine determines whether the first voice traits match the second voice and/or acoustic traits, e.g., with a match score above a confidence threshold. In some embodiments, each trait may have a confidence threshold. For instance, if the first voice input and the second voice input match in amplitude by less than 70%, they are probably not from the same source. In some embodiments, if the first voice input and the second voice input match in amplitude at about 75%, other traits such as pitch may be needed to differentiate the speakers. In some cases, if pitch matches by less than, e.g., 65%, then the two voice inputs may be assumed to be different.

If, at step 832, the first voice traits match the second voice traits (e.g., a match score that meets or exceeds the threshold) then, at step 834, the voice engine outputs that first voice input and second voice input are the same speaker.

If, at step 832, the first voice traits match the second voice traits (e.g., a match score below the confidence threshold) then, at step 816, the voice engine outputs that first voice input and second voice input are different speakers.

Figure 9A:
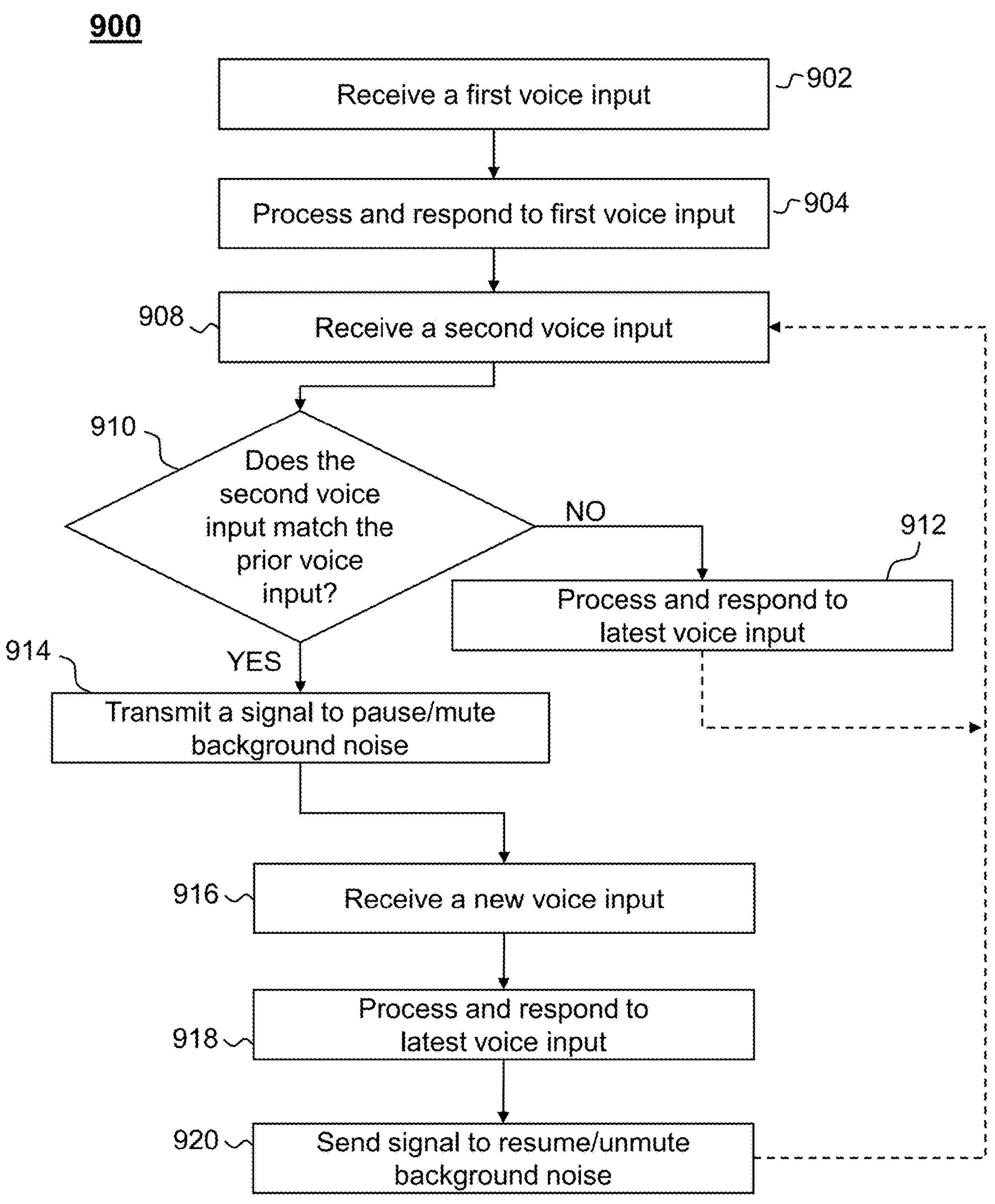
FIG. 9A depicts an illustrative flowchart of a process for determining whether to pause/mute media for a voice query, in accordance with some embodiments of the disclosure.

FIG. 9A depicts an illustrative flowchart of a process for determining whether to pause/mute media for a voice query, in accordance with some embodiments of the disclosure. There are many ways to determine whether to pause and/or mute background audio when receiving a voice query, and process 900 of FIG. 9A is an exemplary method.

Some embodiments may utilize a voice engine to perform one or more parts of process 900, e.g., as part of an ASR platform or interactive virtual assistant application, stored and executed by one or more of the processors and memory of a device and/or server such as those depicted in FIGS. 2-4. A voice engine may be network-connected and work in conjunction with one or more voice processing servers, speech recognition servers, and/or other cloud applications performing necessary functions for voice queries.

At step 902, a voice engine receives a first voice input, e.g., a voice query to be processed. For instance, a virtual assistant may receive a wake word and a query as a first voice input. In scenario 100 of FIG. 1A, wake word 112 and request 114 may be considered a first voice input. In some embodiments, a wake word may be a first voice input. In some embodiments, a wake word may not be necessary, and the first voice input may be a request. In some embodiments, the voice engine (e.g., in conjunction with an ASR engine) generates a first query from the first voice input. For instance, the voice engine may determine text and/or keywords based on the first voice input as the first query. In some embodiments, the voice engine may identify a first profile for the first voice input. For instance, FIGS. 8A and 8B depict exemplary processes of identifying voices.

At step 904, the voice engine processes and responds to the input query. In some embodiments, the voice engine transmits the input query for processing. In some embodiments, the virtual assistant may process the input query, determine one or more keywords and/or text from the input query for a search, and provide search results based on the input query. In some embodiments, a wake word will be removed and/or ignored. In some instances, the input query may comprise a first voice input and a supplemental input. For instance, FIGS. 7B and 7C depict exemplary processes of processing voice queries.

At step 908, the voice engine receives a second voice input. For instance, a second voice command or query may be provided to a virtual assistant. In some embodiments, the second voice input may be a new request or a repeat of one or more portions of the prior request. For example, a user may repeat a request because the response was incorrect. In some cases, the second voice input may be provided by a different user (e.g., a new request or still a repeat).

Figure 9B:
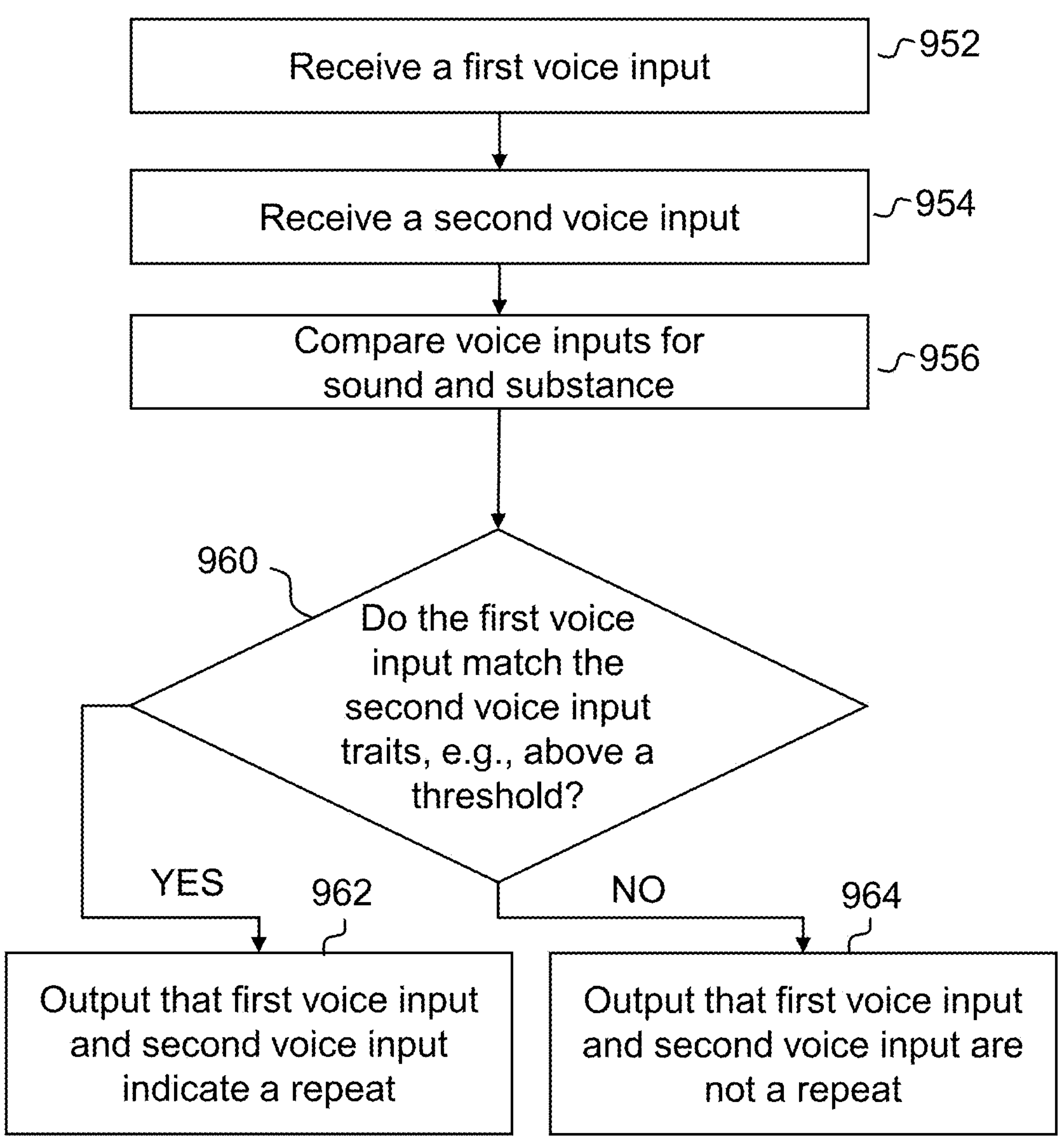
FIG. 9B depicts an illustrative flowchart of a process to determine if two voice inputs have a sound or substance match, in accordance with some embodiments of the disclosure.

At step 910, the voice engine determines whether the second voice input matches the first voice input. In some embodiments, consecutive voice inputs that match may indicate that the voice engine provided an improper response and, e.g., the first input may not have been correctly captured. A repeat request may be identical or similar with regard to the sound and/or substance of the first voice input, e.g., a repeat, a rephrase, one or more similar sounding portions, one or more similar words, etc. In some embodiments, the voice engine may analyze the sound and substance of the first voice input and the second voice input for similarities and generate a match score. In some embodiments, there may be a predetermined threshold match score to determine if two voice inputs match. For instance, a match score of 50 or higher on a 0 to 100 scale may indicate that the second voice input matches the first voice input. In some embodiments, the virtual assistant may be more cautious and assume a match and use, e.g., a match score of 35 or higher on a 0 to 100 scale to indicate that the second voice input matches the first voice input. In some embodiments, the virtual assistant have an adjustable threshold that depends on how recent the last request may have been. For instance, a second request following a first request fairly quickly may indicate a repeated query due to an improper response, so a threshold may be lower (e.g., 20 on a scale of 0-100) when a new voice input occurs 5 seconds after a first query/initial response than if a new voice input were provided 30 seconds after a prior query (e.g., a threshold of 60 on the same scale). FIG. 9B depicts an exemplary process of determining if two voice inputs are a match in sound and/or substance.

If the voice engine determines, at step 910, that the second voice input does not match the first voice input then, at step 912, the voice engine processes and responds to the latest input, e.g., the second voice input. For instance, FIGS. 7B and 7C depict exemplary processes of processing voice queries. In some embodiments, the voice engine transmits the input query for processing and response to the input query. In some embodiments, the virtual assistant may process the input query, determine one or more keywords and/or text from the input query for search, and provide search results based on the input query. In some embodiments, the second voice input may be processed with at least a portion of the first voice input, e.g., as supplemental input. In some embodiments, each input may be combined as one input, e.g., one audio file to be processed. In some embodiments, each input may be converted to text, e.g., via voice recognition processes, and combined as one query input of text and/or data. The voice engine then waits for further voice input, e.g., at step 908.

If, at step 910, the voice engine determines that the second voice input matches the first voice input then, at step 914, the voice engine transmits a signal to pause and/or mute a background noise. For instance, a virtual assistant working in conjunction with a content delivery system, e.g., a cable provider and/or streaming platform, may transmit a signal to pause the content playback to allow a repeat of a request or command. In some embodiments, a virtual assistant may transmit a signal via wire (e.g., over HDMI, ethernet, etc.) or wirelessly (e.g., infrared, RF, WiFi, Bluetooth, etc.) to pause content playback. For instance, a command to pause playback may be transmitted to allow the user to repeat his or her request. In some embodiments, a virtual assistant may transmit a signal, e.g., via wire or wirelessly, to mute sounds in the background of the request. For instance, a command to mute a TV and/or speakers may be transmitted to allow the user to repeat his or her request. In some embodiments, the virtual assistant may be playing back the background noise and, thus, may be able to pause or mute the background noise. In some embodiments, a virtual assistant may be able to detect which device is playing the background noise. For instance, a virtual assistant may receive a signal via network about which device is playing the background noise. In some embodiments, a virtual assistant may identify the background noise (e.g., using a music or content identification application) and determine which device is playing the background noise. In some embodiments, a virtual assistant may identify the background noise and trigger performance of noise cancellation. The voice engine then waits for further voice input, e.g., at step 916.

At step 916, the voice engine receives a new voice input. For instance, a new voice command or query may be provided to a virtual assistant, e.g., while the background noise is muted/paused. In some embodiments, the new voice input may be a new request or a repeat of one or more portions of one or more of the prior requests. For example, a user may repeat a request (multiple times) because the virtual assistant's prior response was incorrect. In some cases, the second voice input may be provided by a different user (e.g., a new request or still a repeat).

At step 918, the voice engine processes and responds to the latest voice input. For instance, FIGS. 7B and 7C depict exemplary processes of processing voice queries. In some embodiments, the voice engine transmits the input query for processing and response to the input query. In some embodiments, the virtual assistant may process the input query, determine one or more keywords and/or text from the input query for a search, and provide search results based on the input query. In some embodiments, the second voice input may be processed with at least a portion of the first voice input, e.g., as supplemental input. In some embodiments, each input may be combined as one input, e.g., one audio file to be processed. In some embodiments, each input may be converted to text, e.g., via voice recognition processes, and combined as one query input of text and/or data.

At step 920, the voice engine transmits a signal to resume and/or unmute the background noise. For instance, a virtual assistant may transmit a signal (via streaming platform and/or content delivery system) to resume/un-pause the content playback after allowing repeat of the request or command. In some embodiments, a virtual assistant may transmit a signal via wire or wirelessly to resume/un-pause content playback. For instance, a command to resume playback may be transmitted after allowing the user to repeat his or her prior request. In some embodiments, a virtual assistant may transmit a signal, e.g., via wire or wirelessly, to unmute sounds in the background of the request that were previously muted to allow repeat of a query. For instance, a command to unmute a TV and/or speakers may be transmitted after previously muting the sounds and allowing the user to repeat his or her request. In some embodiments, the virtual assistant may have been playing back the background noise prior to muting or pausing and, thus, may be able to resume or unmute the background noise quickly.

In some embodiments, the voice engine finishes responding and waits for a new first voice input, e.g., at step 902. For instance, if a minute lapses since an input/response, the voice engine may assume the query was correctly answered. In some embodiments, the voice engine returns to step 908 and waits for further voice input. For instance, if a new input is provided, the voice engine may assume the query was incorrectly answered again and have to determine whether to mute/pause the background noise again.

FIG. 9B depicts an illustrative flowchart of a process to determine if two voice inputs have a sound or substance match, in accordance with some embodiments of the disclosure. There are many ways to determine a match between two voice inputs, and process 950 of FIG. 9B is an exemplary method. Some embodiments may utilize a voice engine to perform one or more parts of process 950, e.g., as part of an ASR platform or interactive virtual assistant application, stored and executed by one or more of the processors and memory of a device and/or server such as those depicted in FIGS. 2-4.

At step 952, a voice engine receives a first voice input. For instance, a voice command or query may be provided to a virtual assistant, e.g., to be processed. A voice engine may capture an input stream that comprises multiple inputs, e.g., from one or more voices. In some embodiments, a request, such as request 114 of FIG. 1A, may be considered the first voice input, which becomes the input query.

At step 954, the voice engine receives a second voice input. For instance, a second voice command or query may be provided to a virtual assistant. In some embodiments, the second voice input may be a new request or a repeat of one or more portions of the prior request. In some embodiments, consecutive voice inputs that match may indicate that the voice engine provided an improper response and, e.g., the first input may not have been correctly captured. For example, a user may repeat a request because the response was incorrect. In some embodiments, a second voice input may be provided by a different user (e.g., a new request or still a repeat).

At step 960, the voice engine compares the first voice input with the second voice input for sound and substance. For instance, the voice engine may compare the first voice input with the second voice input regarding sound by comparing one or more various traits, e.g., acoustic metrics, of each input. For instance, the voice engine may compare one or more acoustic traits such as pitch, tone, resonance, amplitude, loudness, etc. In some cases, the voice engine may compare loudness and/or amplitude to determine if the first voice input and the second voice input came from a similar distance from the microphone prior to analyzing other voice traits. Some embodiments may be able to differentiate voices quickly based on volume before looking at other traits like, e.g., pitch, timbre, echo, etc. In some embodiments, a sound match score may be determined based on a comparison of one or more of acoustic traits such as pitch, timbre, echo, etc. In some embodiments, one or more traits may be measured and/or depicted mathematically (e.g., using a graphic equalizer) and compared. The voice engine may also compare the first voice input with the second voice input regarding substance, e.g., by processing each using ASR/NLP and comparing the substance of each request and/or query. In some embodiments, such a comparison may analyze keywords, topics, homonyms, synonyms, syntax, sentence structure, etc. to determine if the substance of the first voice input and the second input are the same. In some embodiments, a substance match score (normalized, e.g., 0-100) may be determined based on a comparison of one or more of keywords, topics, homonyms, synonyms, syntax, sentence structure, etc. In some embodiments, a match score may be determined based on one or more a sound match score and a substance match score. For instance, a match score may be calculated based on a weighted average of a sound match score and a substance match score. In some embodiments, timing between the voice queries may be considered, e.g., as a factor pointing towards a repeat (or correction) due to loud background noise.

At step 962, the voice engine determines whether the first voice input matches the second voice input based on sound and substance, e.g., above a threshold. In some embodiments, a match score, calculated based on a weighted average of a sound match score and a substance match score, may have a confidence threshold (e.g., meeting or exceeding 75 on a normalized scale of 0-100). In some embodiments, each acoustic trait and/or substantive trait may have a confidence threshold. For instance, if the first voice input and the second voice input match in amplitude by less than 70%, they are probably not from the same source. However, in some embodiments, a high substantive score and a low sound match score may indicate that another source is making the request/query. In some embodiments, if the substantive analysis reveals that each input shares, e.g., greater than two keywords, then the voice engine may determine that the first voice input matches the second voice input. In some embodiments, if the substantive analysis reveals that each input shares, e.g., at least one homophone and/or synonym, then the voice engine may determine that the first voice input matches the second voice input. In some embodiments, a combination of acoustic traits and/or substantive traits may have one or more confidence threshold. For instance, if the voice is determined to be the same with 80% confidence and includes at least one keyword, a match may be determined.

If, at step 962, the first voice input is determined as matching the second voice input (e.g., a match score that meets or exceeds the threshold) then, at step 964, the voice engine outputs that first voice input and second voice input indicate a repeat.

If, at step 962, the first voice input is determined as not matching the second voice input (e.g., a match score that falls below the threshold) then, at step 966, the voice engine outputs that first voice input and second voice input do not indicate a repeat.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. A method of processing a voice input stream comprising a first input and a second input, the method comprising:

receiving, at a microphone of an electronic device, the first input comprising a voice query from a first voice;

receiving the second input comprising a secondary query from a second voice;

streaming, from the electronic device to a cloud service, the received first and second voice inputs for analysis, wherein the analysis by the cloud service comprises:

inputting the received first and second voice inputs into a machine learning model trained to determine a sound match score and a substance match score, wherein:

the sound match score comprises a probability that voices corresponding to two separate voice inputs match;

the substance match score comprises a probability that the substance of two separate voice inputs match;

determining a weighted average of the sound match score and the substance match score; and comparing the weighted average of the sound match score and the substance match score to a confidence threshold;

determining, based on the analysis by the cloud service, that the second voice does not match the first voice; and in response to determining that the second voice input does not match the first voice input:

processing the voice query, without the second query;

executing a first search, by the electronic device, to obtain first results that correspond to the voice query from the first voice;

filtering the obtained first results using one or more keywords from the secondary query from the second voice;

determining the obtained number of first results do not exceed a threshold number of first results;

based at least in part on determining the obtained number of first results do not exceed a threshold number of first results, automatically executing a second search, by the electronic device, to obtain second results that correspond to the voice query from the first voice and the second voice; and producing the filtered first results and at least one second result, wherein the second result is based at least in part on one or more keywords from second voice, via a speaker or display associated with the electronic device.

2. The method of claim 1 further comprising:

calculating a first relevance score for the first results;

processing the voice query with one or more portions of the secondary query to produce second results;

calculating a second relevance score for the second results;

comparing the first relevance score to the second relevance score; and in response to determining the second relevance score meets or exceeds the first relevance score, providing a portion of the second results.

3. The method of claim 1, wherein determining that the second voice does not match the first voice comprises:

comparing traits of the first voice with traits of the second voice;

determining, based on the comparison, a voice match score;

determining that the voice match score is less than a match threshold; and outputting that no match exists.

4. The method of claim 1, wherein determining that the second voice does not match the first voice comprises:

accessing a plurality of voice profiles;

comparing the first input to the plurality of voice profiles to determine a first profile for the first voice;

comparing the second input to the plurality of voice profiles to determine a second profile for the second voice;

determining that the first profile and is not a match to the second profile; and outputting that no match exists.

5. The method of claim 1, wherein the voice query comprises a first set of text based on the first input and the second query comprises a second set of text based on the second input.

6. The method of claim 1, wherein determining that the second voice does not match the first voice further comprises:

receiving a third input comprising a third query from a third voice;

determining that the third voice matches the first voice; and combining the third query with the first query.

7. The method of claim 1, wherein determining that the second voice does not match the first voice further comprises:

receiving a third input comprising a third query from a third voice;

determining that the third query matches at least one of the following: the first query and the second query;

transmitting a command to pause or mute content;

receiving a fourth input comprising a fourth query; and processing the fourth query.

8. A system for processing a voice input stream comprising a first input and a second input, the system comprising:

input/output circuitry configured to:

receive, at a microphone of an electronic device, the first input comprising a voice query from a first voice;

receive the second input comprising a secondary query from a second voice; and processing circuitry configured to:

stream, from the electronic device to a cloud service, the received first and second voice inputs for analysis, wherein the analysis by the cloud service comprises:

inputting the received first and second voice inputs into a machine learning model trained to determine a sound match score and a substance match score, wherein:

the sound match score comprises a probability that voices corresponding to two separate voice inputs match;

the substance match score comprises a probability that the substance of two separate voice inputs match;

determining a weighted average of the sound match score and the substance match score; and comparing the weighted average of the sound match score and the substance match score to a confidence threshold;

determine, based on the analysis by the cloud service, that the second voice does not match the first voice; and in response to determining that the second voice does not match the first voice:

process the voice query, without the second query;

execute a first search, by the electronic device, to obtain first results that correspond to the voice query from the first voice;

filter the obtained first results using one or more keywords from the secondary query from the second voice;

determine the obtained number of first results do not exceed a threshold number of first results;

based at least in part on determining the obtained number of first results do not exceed a threshold number of first results, automatically execute a second search, by the electronic device, to obtain second results that correspond to the voice query from the first voice and the second voice; and produce the filtered first results and at least one second result, wherein the second result is based at least in part on one or more keywords from second voice, via a speaker or display associated with the electronic device.

9. The system of claim 8, wherein the instructions further cause the control circuitry to:

calculate a first relevance score for the first results;

process the voice query with one or more portions of the secondary query to produce second results;

calculate a second relevance score for the second results;

compare the first relevance score to the second relevance score; and in response to determining the second relevance score meets or exceeds the first relevance score, provide a portion of the second results.

10. The system of claim 8, wherein the processing circuitry is further configured to determine that the second voice does not match the first voice by:

comparing traits of the first voice with traits of the second voice;

determining, based on the comparison, a voice match score;

determining that the voice match score is less than a match threshold; and outputting that no match exists.

11. The system of claim 8, wherein the processing circuitry is further configured to determine that the second voice does not match the first voice by:

accessing a plurality of voice profiles;

comparing the first input to the plurality of voice profiles to determine a first profile for the first voice;

comparing the second input to the plurality of voice profiles to determine a second profile for the second voice;

determining that the first profile and is not a match to the second profile; and outputting that no match exists.

12. The system of claim 8, wherein the voice query comprises a first set of text based on the first input and the second query comprises a second set of text based on the first input.

13. The system of claim 8, wherein the input/output circuitry is further configured to receive a third input comprising a third query from a third voice; and wherein the processing circuitry is further configured to determine that the second voice does not match the first voice by:

determining that the third voice matches the first voice; and combining the third query with the first query.

14. The system of claim 8, wherein the input/output circuitry is further configured to:

receive a third input comprising a third query from a third voice;

transmit a command to pause or mute content;

receive a fourth input comprising a fourth query; and wherein the processing circuitry is further configured to determine that the second voice does not match the first voice by:

determining that the third query matches at least one of the following: the first query and the second query;

instructing the input/output circuitry to transmit a command to pause or mute content in response to determining that the third query matches the first query or the second query; and processing the fourth query.

15. The method of claim 1, further comprising:

detecting the first input comprises a first actor;

detecting the second input comprises a second actor;

based at least in part on detecting the first actor and the second actor in the first and second input, indicating the second input as supplemental data; and in response to determining the obtained first results did not meet or exceed a threshold number of first results, automatically executing the second search to obtain second results that correspond to the voice query from the first voice and the second voice.

* * * * *